(12) United States Patent
Rambo

(10) Patent No.: US 11,492,970 B2
(45) Date of Patent: Nov. 8, 2022

(54) THERMAL MANAGEMENT SYSTEM WITH FUEL COOLING

(71) Applicant: General Electric Company, Schenectady, NY (US)

(72) Inventor: Jeffrey Douglas Rambo, Mason, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/128,675

(22) Filed: Dec. 21, 2020

(65) Prior Publication Data

US 2022/0195925 A1 Jun. 23, 2022

(51) Int. Cl.

| F02C 7/14 | (2006.01) |
|---|---|
| F02C 7/18 | (2006.01) |
| F02C 7/232 | (2006.01) |
| F02C 9/26 | (2006.01) |

(52) U.S. Cl.
CPC .................. *F02C 7/14* (2013.01); *F02C 7/18* (2013.01); *F02C 7/232* (2013.01); *F02C 9/26* (2013.01); *F05D 2220/323* (2013.01); *F05D 2260/213* (2013.01); *F05D 2260/232* (2013.01); *F05D 2270/42* (2013.01); *F05D 2270/44* (2013.01)

(58) Field of Classification Search
CPC .... F02C 7/14; F02C 7/18; F02C 7/224; F02C 9/26; F02C 29/28; F05D 2260/213
See application file for complete search history.

(56) References Cited

U.S. PATENT DOCUMENTS

| 4,505,124 A | 3/1985 | Mayer |
| 4,705,100 A | 11/1987 | Black et al. |
| 4,714,139 A | 12/1987 | Lorenz et al. |
| 4,776,536 A | 10/1988 | Hudson et al. |
| 5,177,951 A * | 1/1993 | Butler ...................... F02C 7/14 60/772 |
| 6,182,435 B1 | 2/2001 | Niggemann et al. |
| 6,415,595 B1 | 7/2002 | Wilmot, Jr. et al. |
| 7,055,505 B2 | 6/2006 | Washeleski et al. |
| 7,260,926 B2 | 8/2007 | Sabatino et al. |

(Continued)

OTHER PUBLICATIONS

Co-pending U.S. Appl. No. 17/128,642, filed Dec. 21, 2020.
Co-pending U.S. Appl. No. 17/128.704, filed Dec. 21, 2020.

*Primary Examiner* — Alain Chau
(74) *Attorney, Agent, or Firm* — Dority & Manning, P.A.

(57) ABSTRACT

Systems and methods for operating systems are provided. For example, a system comprises a coolant flowpath having a coolant flowing therethrough, a cooling system for cooling the coolant disposed along the coolant flowpath, a fuel flowpath having a fuel flowing therethrough, a heat exchanger fluidly connected to the coolant flowpath and the fuel flowpath for heat transfer between the coolant and the fuel to cool the fuel, and a fuel tank for accumulating the cooled fuel. The fuel is in thermal communication with a first thermal load to cool the load. An exemplary method comprises flowing a heat exchange fluid along a flowpath; flowing a fuel along a fuel flowpath including a fuel tank; passing both the heat exchange fluid and fuel through a heat exchanger to cool the fuel; and controlling the fuel flow from the heat exchanger to the fuel tank for accumulation of the cooled fuel.

21 Claims, 13 Drawing Sheets

(56) References Cited

U.S. PATENT DOCUMENTS

| | | | |
|---|---|---|---|
| 7,984,606 B2* | 7/2011 | Smith | F02C 7/14 60/734 |
| 8,042,343 B2 | 10/2011 | Jarlestal | |
| 8,132,398 B2 | 3/2012 | Wang et al. | |
| 8,499,822 B2* | 8/2013 | Bulin | F02C 7/224 165/41 |
| 8,522,572 B2* | 9/2013 | Coffinberry | F02C 7/12 60/806 |
| 8,534,044 B2* | 9/2013 | Smith | F02C 7/224 60/267 |
| 8,677,755 B2 | 3/2014 | Bulin et al. | |
| 9,074,562 B2 | 7/2015 | Tsutsumi et al. | |
| 9,151,180 B2 | 10/2015 | Veilleux, Jr. | |
| 9,334,802 B2 | 5/2016 | Papa et al. | |
| 9,561,857 B2 | 2/2017 | Weber | |
| 9,604,730 B2 | 3/2017 | Hagh et al. | |
| 9,687,773 B2 | 6/2017 | Johnson et al. | |
| 9,823,030 B2 | 11/2017 | Veilleux, Jr. | |
| 10,082,078 B2* | 9/2018 | Snape | F02C 7/14 |
| 10,086,222 B2 | 10/2018 | Tichbome et al. | |
| 10,352,241 B2 | 7/2019 | Snape et al. | |
| 10,526,971 B2 | 1/2020 | Mastrocola et al. | |
| 10,752,374 B1* | 8/2020 | Lui | B64D 37/34 |
| 10,994,857 B2* | 5/2021 | Bowman | B64D 37/005 |
| 11,077,949 B2* | 8/2021 | Behrens | F01D 15/10 |
| 11,156,161 B2* | 10/2021 | Snape | F02C 7/14 |
| 11,199,133 B2* | 12/2021 | Cocks | B64D 37/34 |
| 2007/0101731 A1 | 5/2007 | Bayt et al. | |
| 2010/0107603 A1* | 5/2010 | Smith | F02C 7/224 701/100 |
| 2010/0212857 A1* | 8/2010 | Bulin | F02C 7/224 165/41 |
| 2011/0252764 A1* | 10/2011 | Smith | F02C 7/14 60/39.83 |
| 2012/0000205 A1* | 1/2012 | Coffinberry | B64D 13/06 60/806 |
| 2012/0297780 A1 | 11/2012 | Bruno et al. | |
| 2012/0297789 A1* | 11/2012 | Coffinberry | B64D 37/34 60/39.83 |
| 2013/0086909 A1* | 4/2013 | Wang | F02C 9/36 60/730 |
| 2016/0280387 A1* | 9/2016 | Snape | F02C 7/14 |
| 2017/0058774 A1 | 3/2017 | Pickford | |
| 2017/0167307 A1 | 6/2017 | Scipio et al. | |
| 2018/0155046 A1* | 6/2018 | Bowman | B64D 37/005 |
| 2018/0187601 A1* | 7/2018 | Segura | F28D 7/0008 |
| 2019/0003391 A1* | 1/2019 | Snape | F02C 7/14 |
| 2020/0108937 A1* | 4/2020 | Behrens | F02C 9/18 |
| 2020/0130858 A1* | 4/2020 | Julien | B64D 41/00 |
| 2020/0191057 A1* | 6/2020 | Cocks | F01D 25/02 |
| 2020/0332714 A1* | 10/2020 | Ribarov | F25B 1/08 |
| 2020/0332716 A1* | 10/2020 | Ribarov | F02C 7/185 |

* cited by examiner

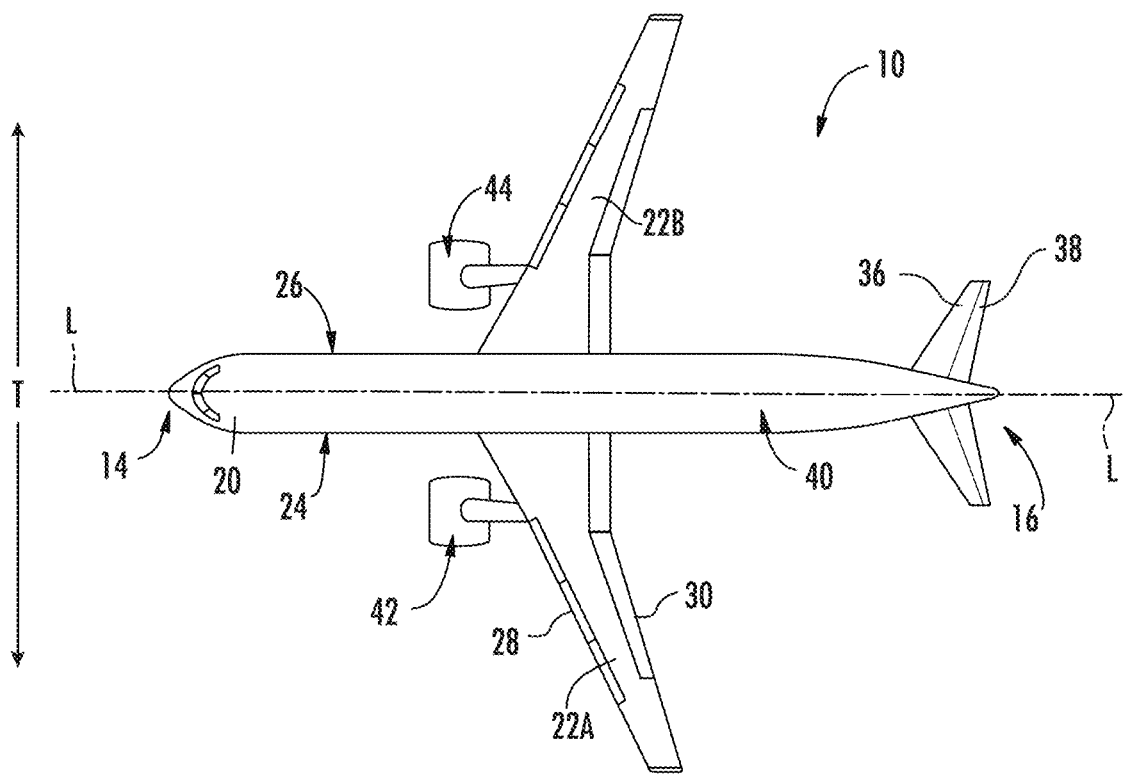
FIG. - 1A -
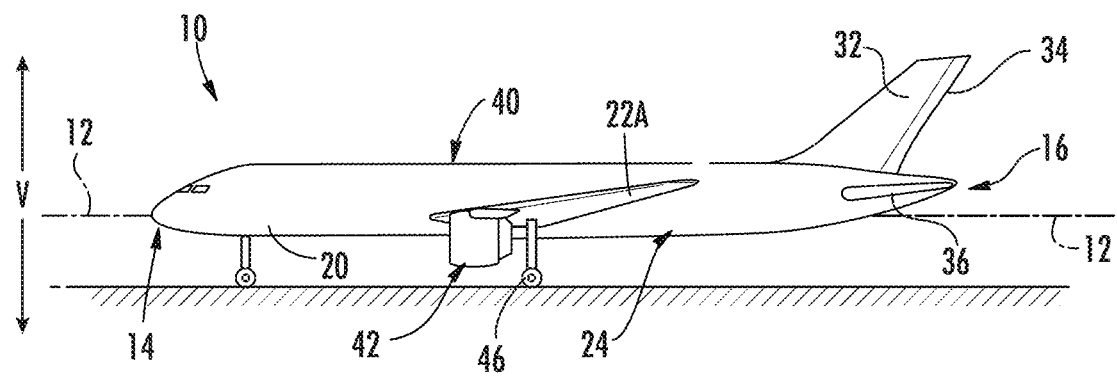
FIG. - 1B -

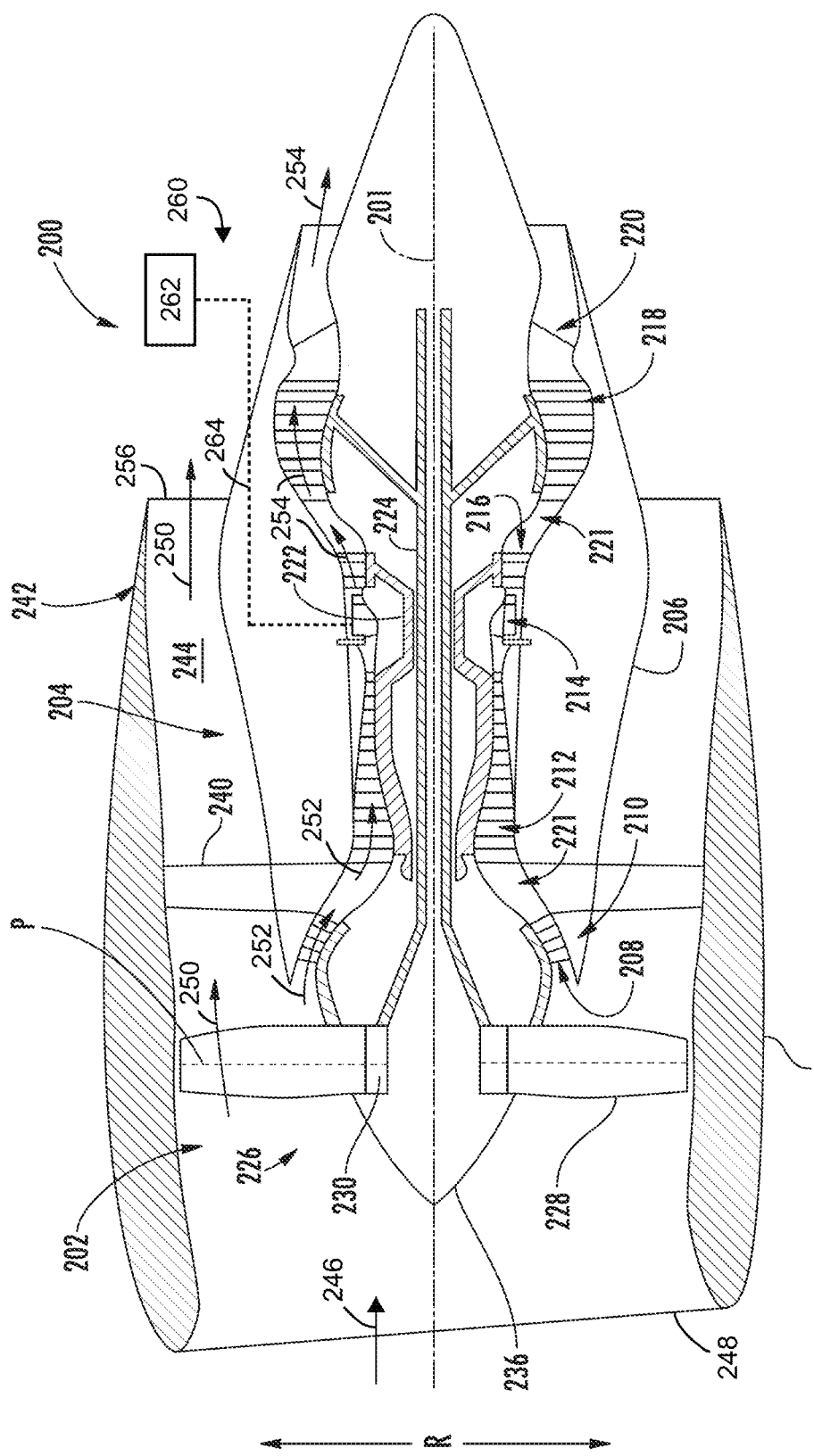
FIG. -1C-

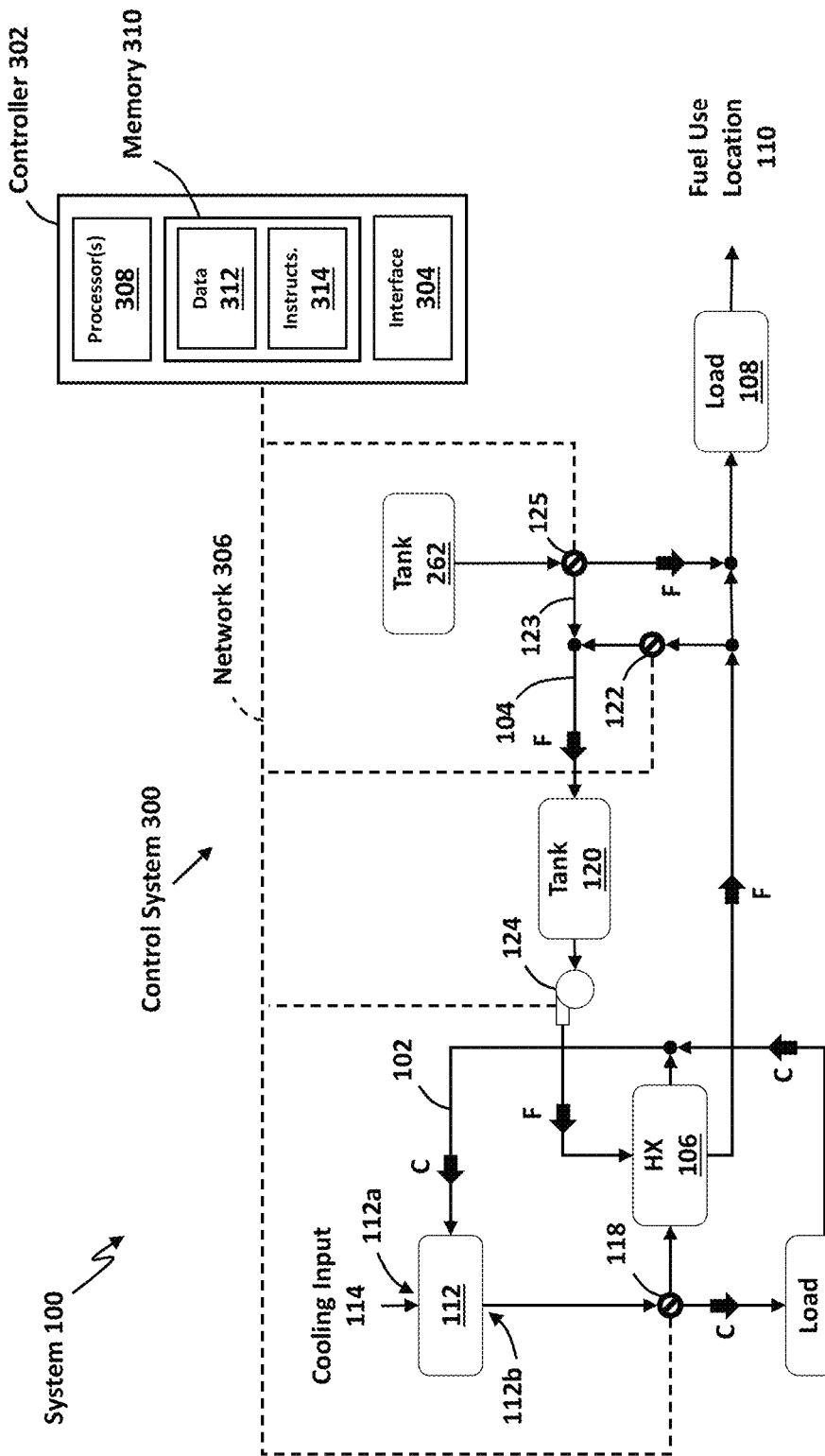
FIG. – 2A –

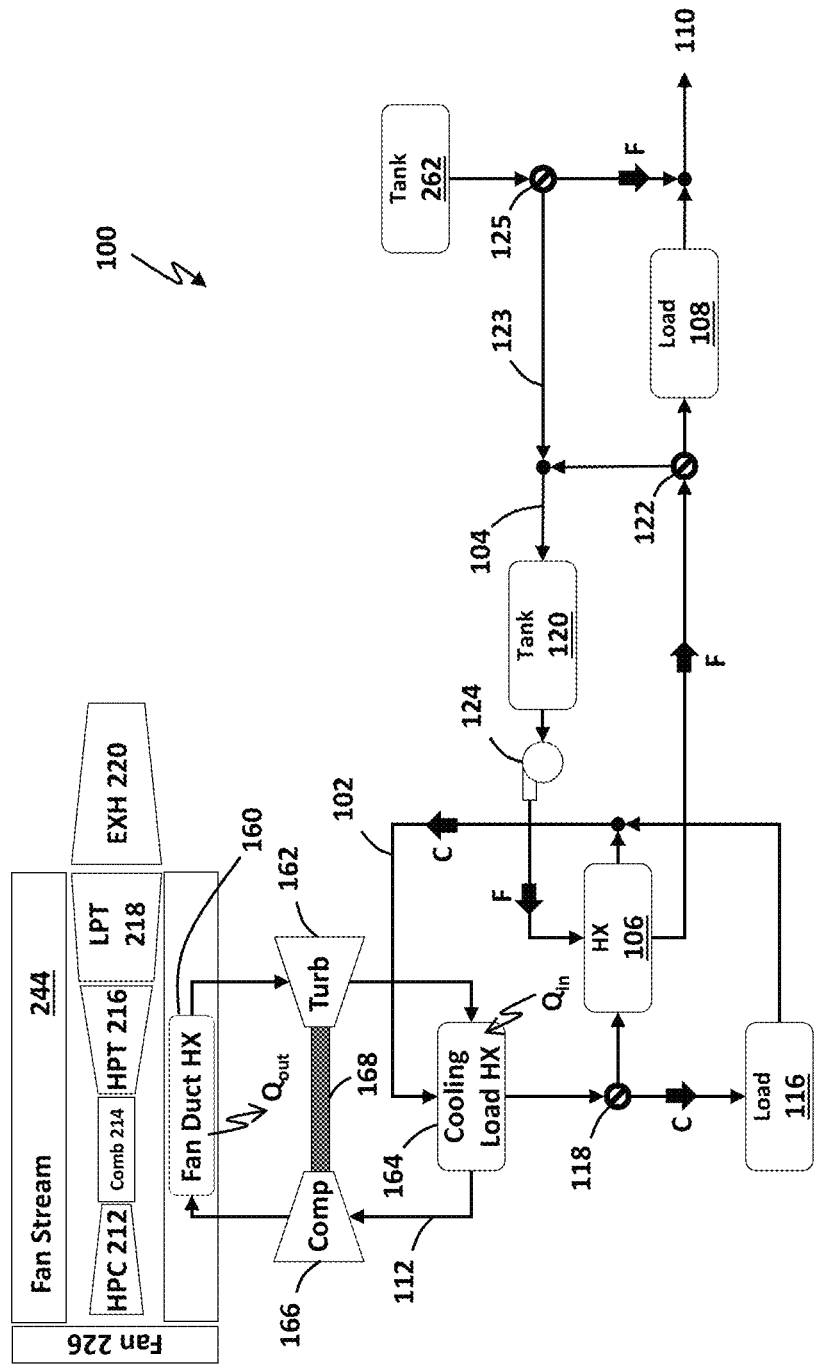
FIG. –2B –

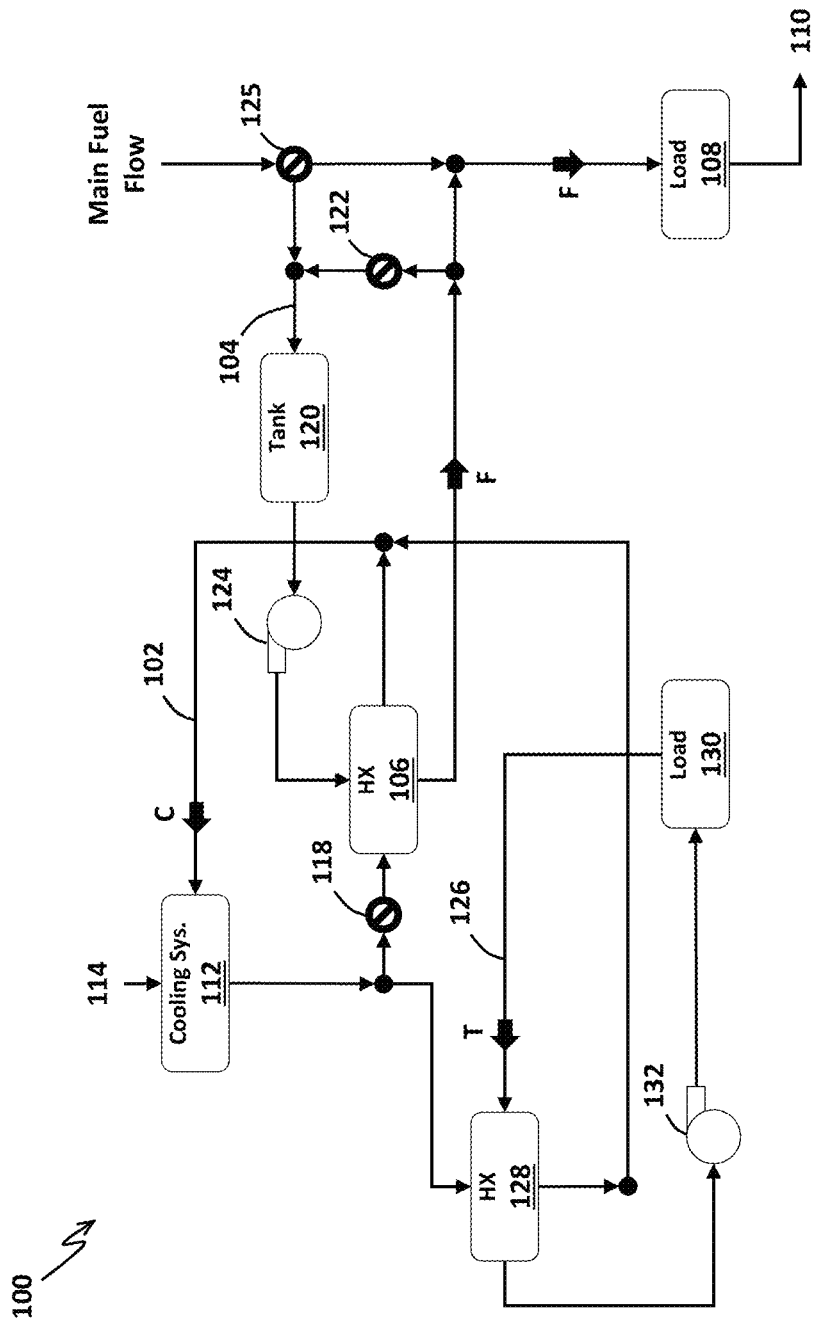
FIG. – 3A –

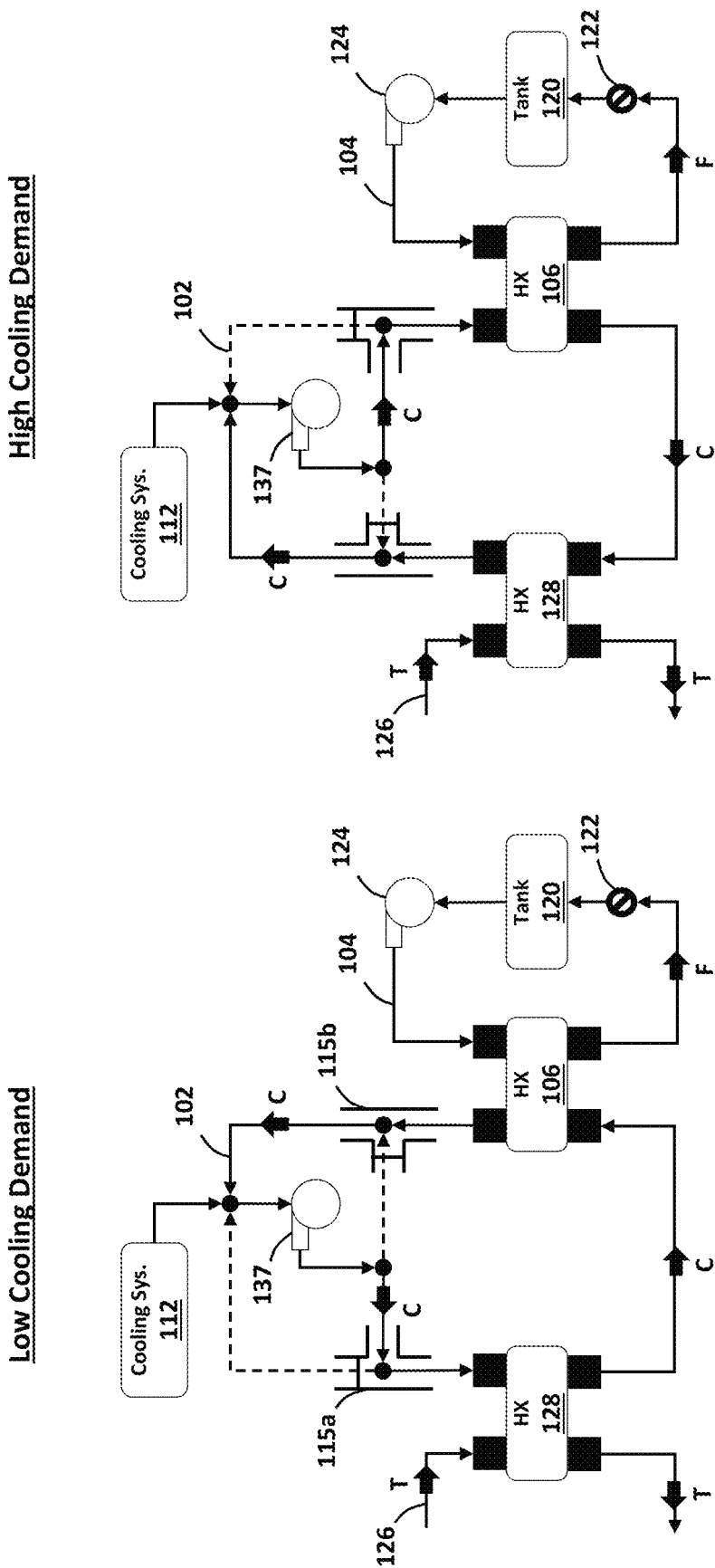
FIG. – 3B –

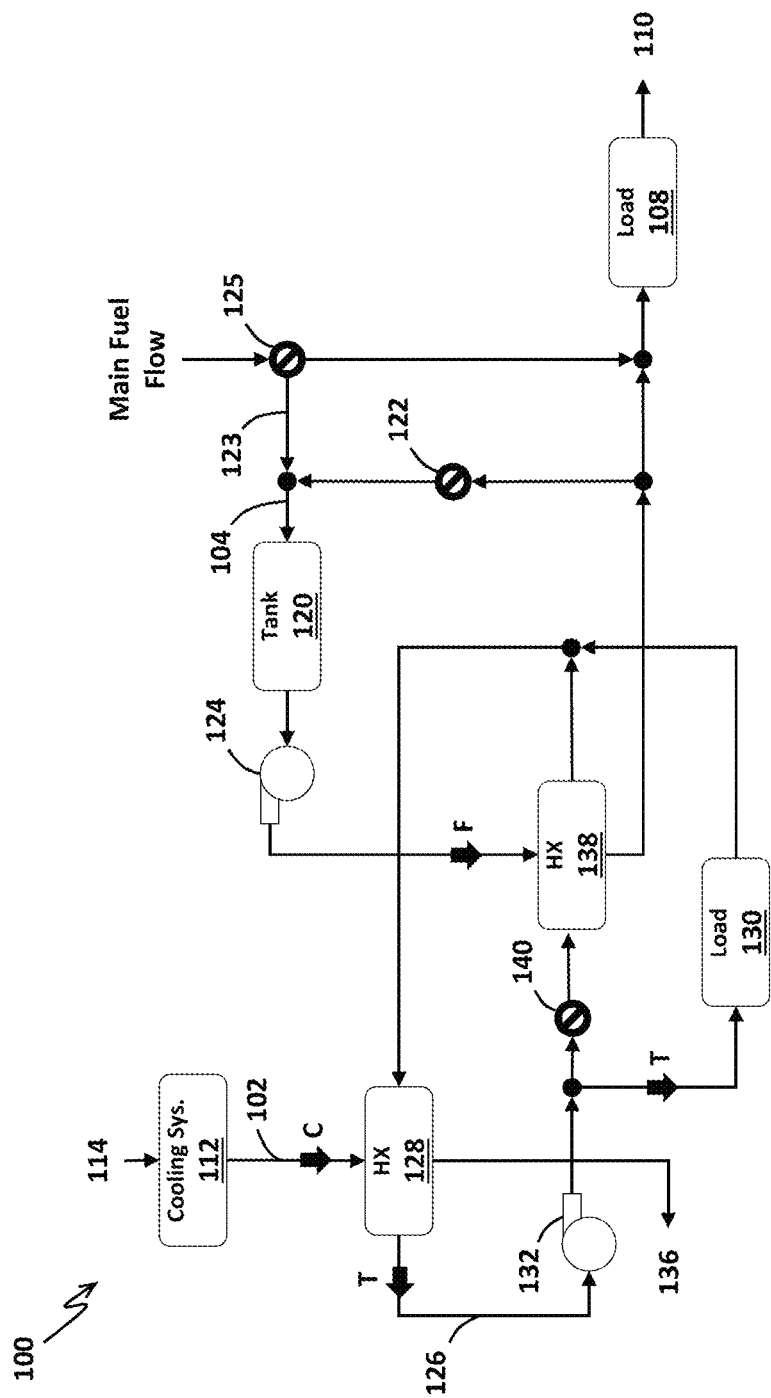
FIG. -4-

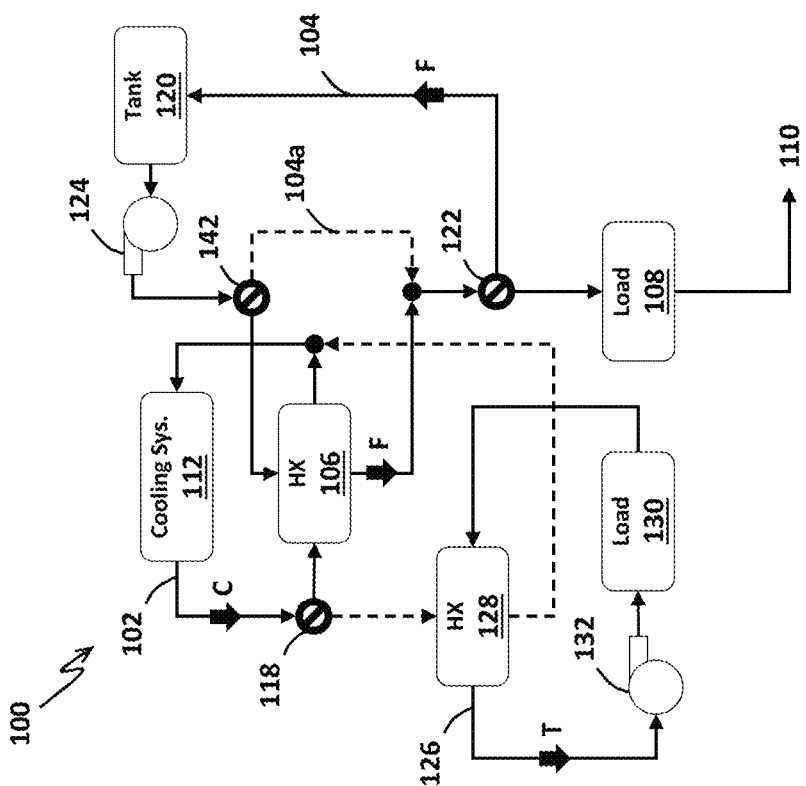
FIG. – 5B –
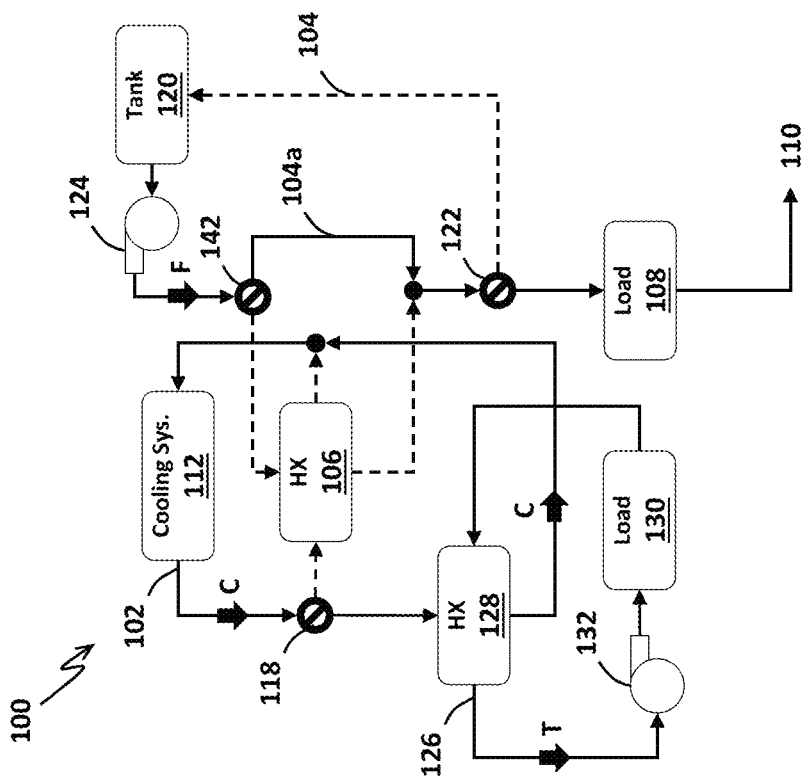
FIG. – 5A –

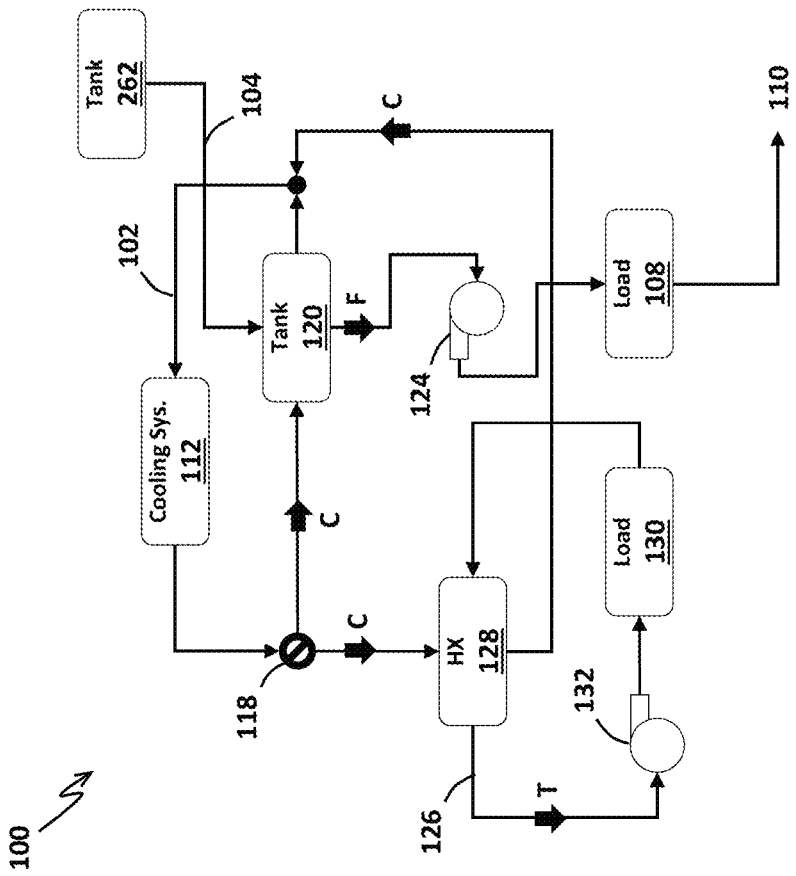
FIG. – 6A –

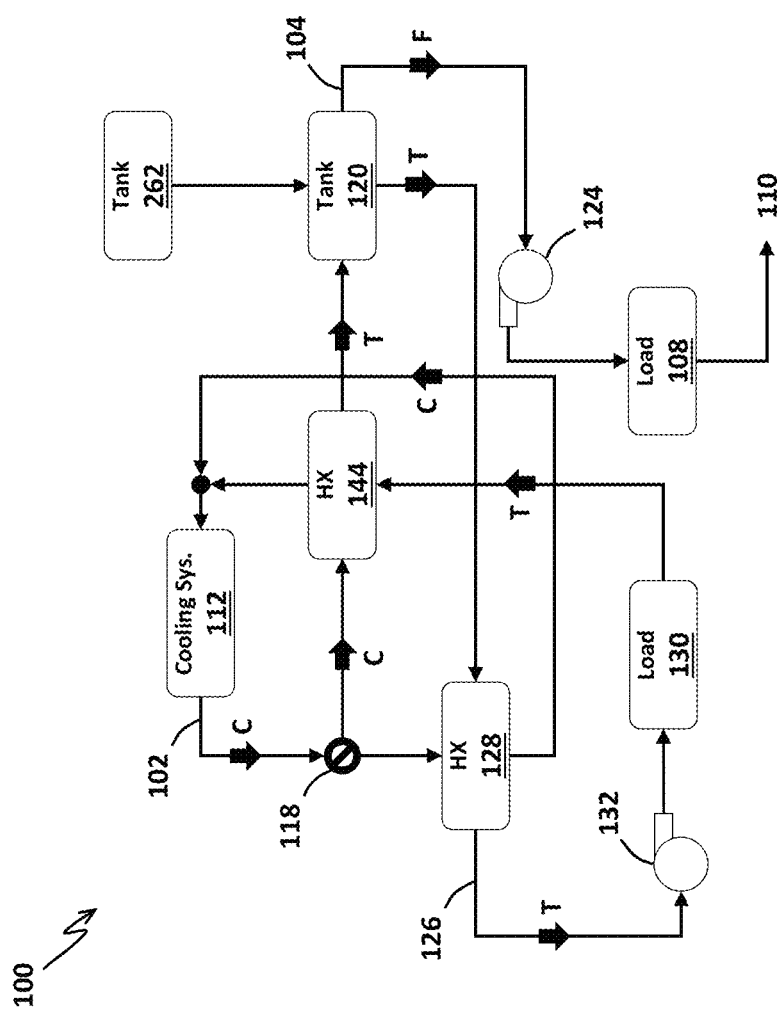
FIG. – 6B –

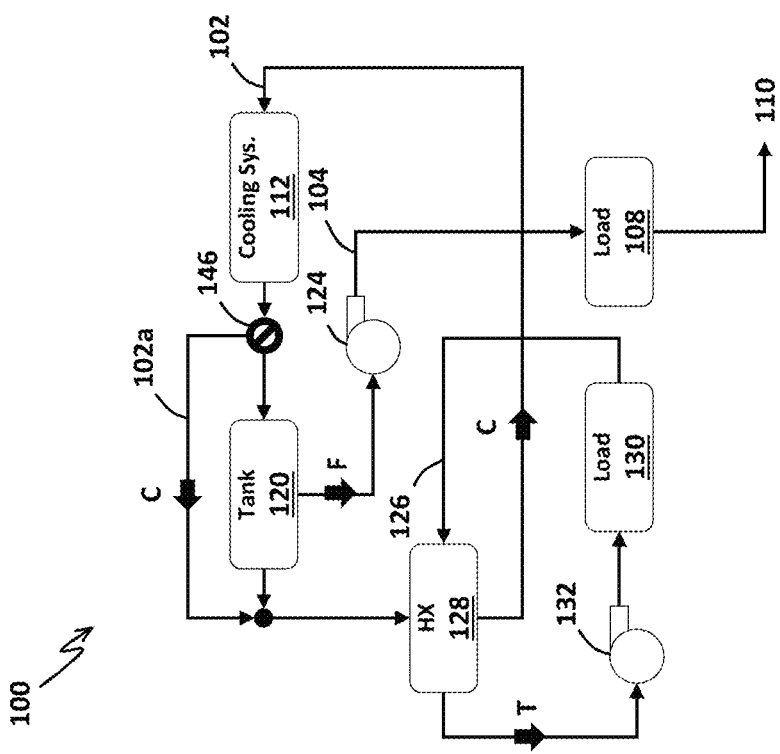
FIG. -7B-
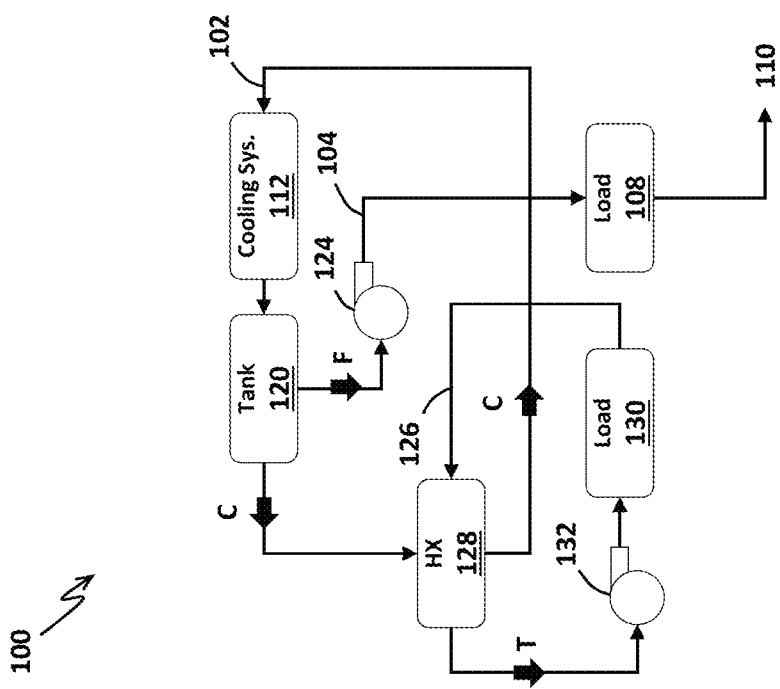
FIG. -7A-

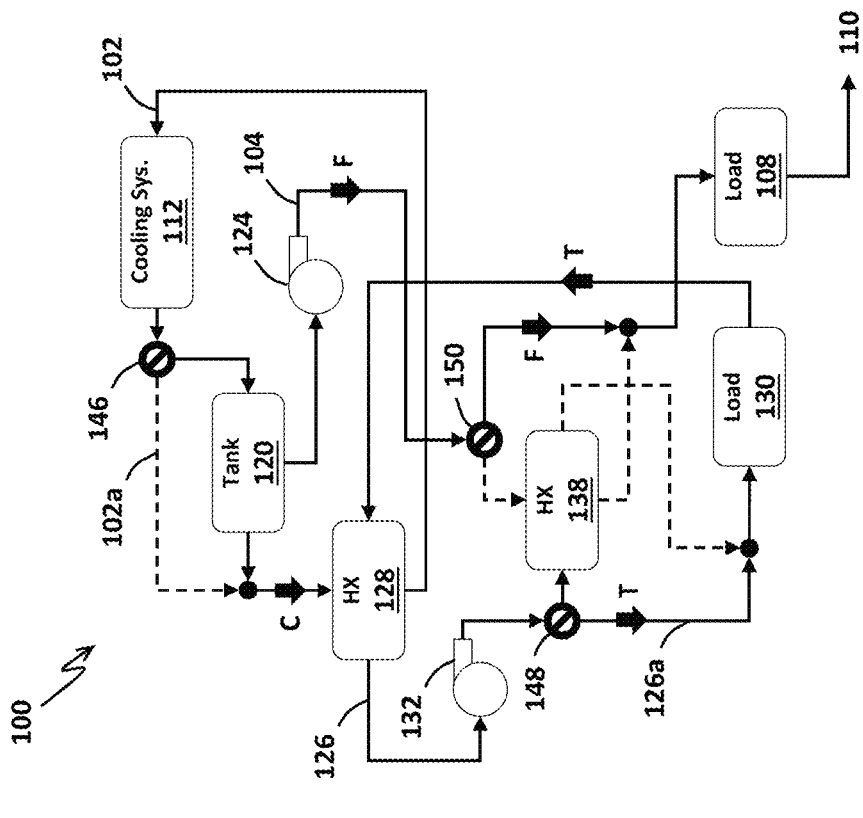
FIG. -8B-
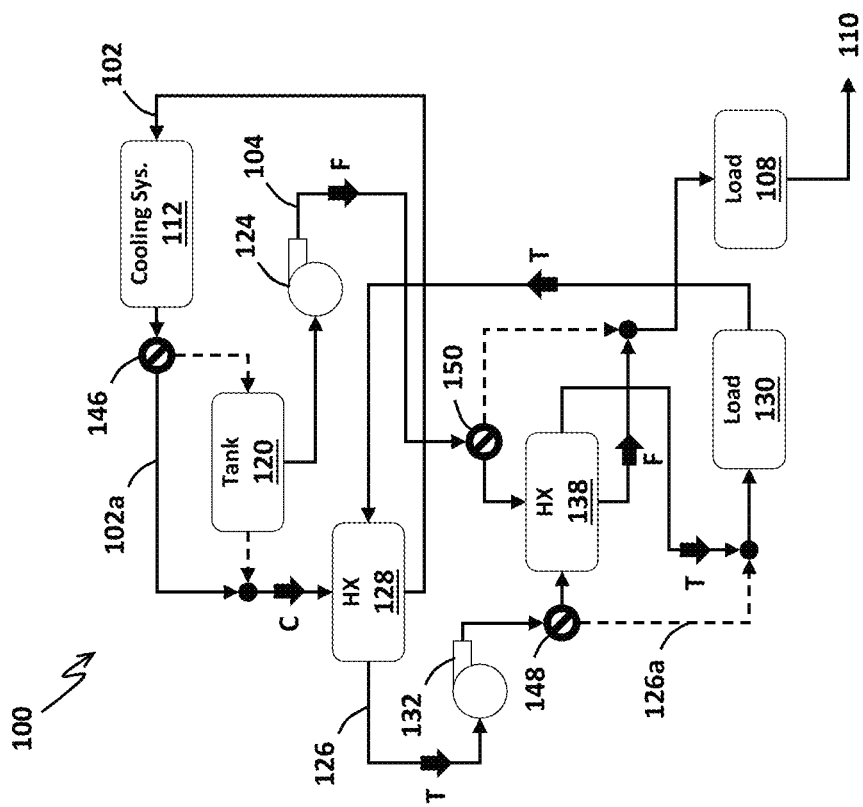
FIG. -8A-

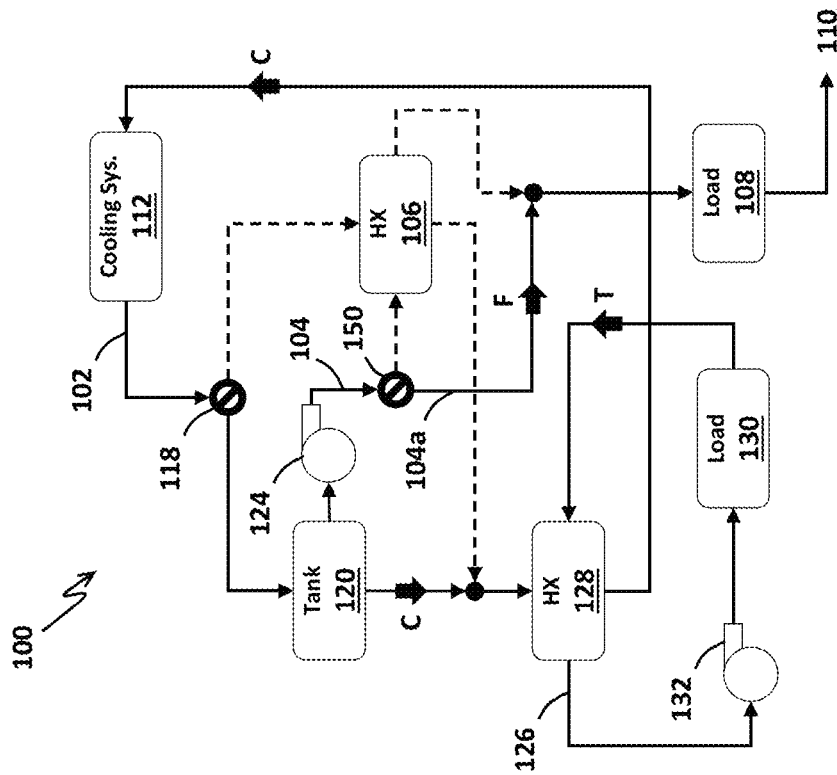
FIG. –9B –
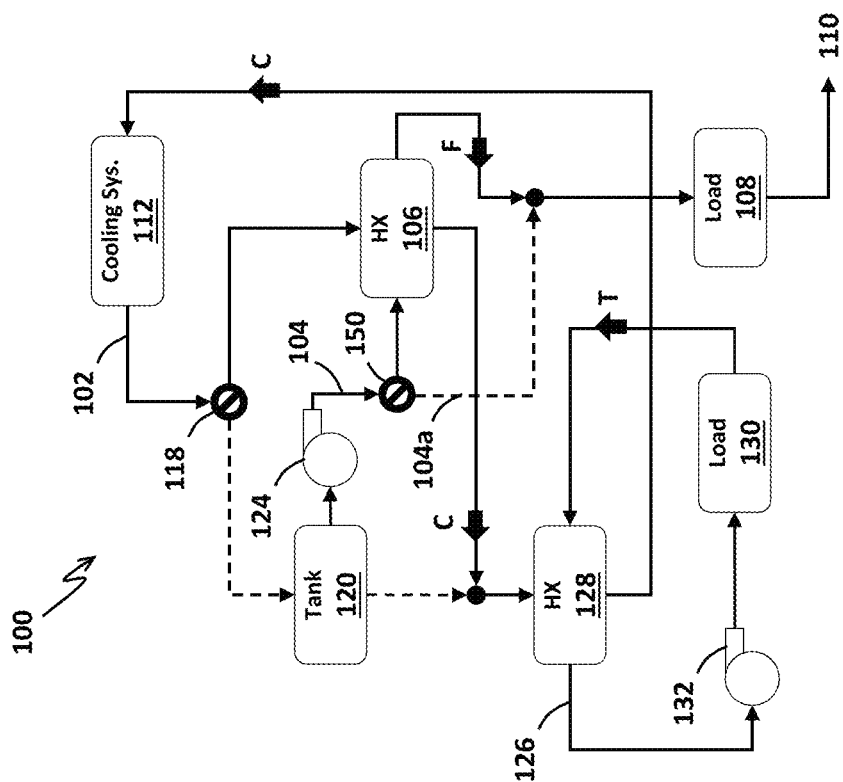
FIG. –9A –

THERMAL MANAGEMENT SYSTEM WITH FUEL COOLING

FIELD

The present subject matter relates generally to power and/or thermal management systems and, more particularly, to thermal management systems utilizing a fuel of an engine and/or vehicle for regenerative cooling capacity.

BACKGROUND

Vehicles such as aircraft, as well as engines such as gas turbine engines that may be used, e.g., for power generation for such vehicles or for other applications, typically have one or more systems that generate heat. Usually, thermal management systems (TMS) are provided for managing heat generation of the vehicle and/or engine. However, TMS often generate cooling capacity during periods of low cooling demand (i.e., when heat generation is low) and may not generate sufficient cooling capacity during periods of high cooling demand. Thus, excess cooling capacity typically is lost and is not available when increased cooling capacity is needed. Accordingly, improvements to vehicles such as aircraft, engines (including engines for vehicles), and thermal management systems that help overcome these issues and/or take advantage of potential opportunities, such as the thermal capacity of engine and/or vehicle fuel, would be useful.

BRIEF DESCRIPTION

Aspects and advantages of the invention will be set forth in part in the following description, or may be obvious from the description, or may be learned through practice of the invention.

In one exemplary embodiment of the present subject matter, a system is provided. The system comprises a coolant flowpath having a coolant flowing therethrough, a cooling system for cooling the coolant disposed along the coolant flowpath, a fuel flowpath having a fuel flowing therethrough, and a coolant-fuel heat exchanger for heat transfer between the coolant and the fuel to cool the fuel. The coolant-fuel heat exchanger is fluidly connected to both the coolant flowpath and the fuel flowpath. The system further comprises a fuel tank for accumulating the cooled fuel. The fuel is in thermal communication with a first thermal load to cool the first thermal load.

In another exemplary embodiment of the present subject matter, a system is provided. The system comprises a coolant flowpath having a coolant flowing therethrough; a fuel flowpath having a fuel flowing therethrough; a thermal transport flowpath having a thermal transport fluid flowing therethrough; a fuel-transport heat exchanger for heat transfer between the fuel and the thermal transport fluid to cool the fuel, the fuel-transport heat exchanger fluidly connected to both the fuel flowpath and the thermal transport flowpath; and a fuel tank for accumulating the cooled fuel, wherein the fuel is in thermal communication with a first thermal load to cool the first thermal load and the thermal transport fluid is in thermal communication with a second thermal load to cool the second thermal load.

In yet another exemplary embodiment of the present subject matter, a method of operating a system is provided. The method comprises flowing a coolant along a coolant flowpath, the coolant flowpath including a cooling system such that the coolant passes through the cooling system to cool the coolant, the coolant flowpath further including a coolant-cooled thermal load $L_{cool}$; flowing a fuel along a fuel flowpath, the fuel flowpath including a fuel tank for accumulating the fuel and a fuel-cooled thermal load $L_{fuel}$; passing both the coolant and the fuel through a coolant-fuel heat exchanger to cool the fuel; and controlling the flow of the fuel from the coolant-fuel heat exchanger to the fuel tank for accumulation of the cooled fuel. The coolant has a thermal capacity $TC_{cool}$ and the fuel has a thermal capacity $TC_{fuel}$.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1A is a top view of an aircraft vehicle in accordance with an exemplary embodiment of the present subject matter.

FIG. 1B is a side view of the exemplary aircraft vehicle of FIG. 1A.

FIG. 1C is a schematic, cross-sectional view of a gas turbine engine in accordance with an exemplary embodiment of the present subject matter.

FIGS. 2A-9B are flow diagrams of a thermal management system in accordance with various exemplary embodiments of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1A provides a top view of an exemplary aircraft vehicle 10 as may incorporate various embodiments of the present subject matter. FIG. 1B provides a port side 24 view of the aircraft 10 as illustrated in FIG. 1A. As shown in FIGS. 1A and 1B collectively, the aircraft 10 defines a longitudinal direction L that extends therethrough, a vertical direction V, a transverse direction $T_v$, a forward end 14, and an aft end 16.

Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction $T_v$ with respect to the longitudinal direction L, from the port side 24 of the fuselage 20. Further, the second wing 22B similarly extends outwardly from the fuselage 20, generally along the transverse direction $T_v$ with respect to the longitudinal direction L, from a starboard side 26 of the fuselage 20. Each of the wings 22A, 22B for the exemplary embodiment depicted includes one or more leading edge flaps 28 and one or more trailing edge flaps 30.

Referring still to the exemplary aircraft 10 of FIGS. 1A and 1B, the aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40. However, it should be appreciated that in other exemplary embodiments of the present disclosure, the aircraft 10 may additionally or alternatively include any other suitable configuration of stabilizers that may or may not extend directly along the vertical direction V or horizontal/transverse direction $T_v$. In addition, alternative stabilizers may be any suitable shape, size, configuration, or orientation while remaining within the scope of the present subject matter.

The exemplary aircraft 10 of FIGS. 1A and 1B also includes a propulsion system. The exemplary propulsion system depicted includes a plurality of aircraft engines, at least one of which mounted to each of the pair of wings 22A, 22B. Specifically, the plurality of aircraft engines includes a first aircraft engine 42 mounted to the first wing 22A and a second aircraft engine 44 mounted to the second wing 22B. In at least certain exemplary embodiments, the aircraft engines 42, 44 may be configured as turbofan jet engines (see, e.g., FIG. 1C) suspended beneath the wings 22A, 22B in an under-wing configuration. Alternatively, however, in other exemplary embodiments any other suitable aircraft engine may be provided. For example, in other exemplary embodiments the first and/or second aircraft engines 42, 44 may be configured as turbojet engines, turboshaft engines, turboprop engines, etc. Further, in still other exemplary embodiments, the propulsion system may include one or more electric, or hybrid-electric, aircraft engines (e.g., electric fans).

Referring now to FIG. 1C, a schematic cross-sectional view is provided of a gas turbine engine in accordance with an exemplary embodiment of the present disclosure. More particularly, for the embodiment of FIG. 1C, the gas turbine engine is a high-bypass turbofan jet engine 200, referred to herein as "turbofan engine 200" or "engine 200." Notably, in at least certain embodiments, the aircraft engines 42, 44 of FIGS. 1A and 1B may be configured in substantially the same manner as exemplary turbofan engine 200 depicted in FIG. 1C, discussed below.

As shown in FIG. 1C, the turbofan engine 200 defines an axial direction A (extending parallel to a longitudinal centerline 201 provided for reference), a radial direction R, and a circumferential direction (extending about the axial direction A; not depicted in FIG. 1C). In general, the turbofan engine 200 includes a fan section 202 and a turbomachine 204 disposed downstream from the fan section 202.

The exemplary turbomachine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define at least in part a core air flowpath 221 extending from the annular inlet 208 to the jet nozzle exhaust section 220. The turbofan engine 200 further includes one or more drive shafts. More specifically, the turbofan engine 200 includes a high pressure (HP) shaft or spool 222 drivingly connecting the HP turbine 216 to the HP compressor 212, and a low pressure (LP) shaft or spool 224 drivingly connecting the LP turbine 218 to the LP compressor 210.

For the depicted embodiment, fan section 202 includes a fan 226 having a plurality of fan blades 228 coupled to a disk 230 in a spaced apart manner. As depicted, the fan blades 228 extend outward from the disk 230 generally along the radial direction R. The fan blades 228 and disk 230 are together rotatable about the longitudinal axis 201 by LP shaft 224. In some embodiments, a power gear box having a plurality of gears may be included for stepping down the rotational speed of the LP shaft 224 to a more efficient rotational fan speed.

Referring still to the exemplary embodiment of FIG. 1C, the disk 230 is covered by rotatable front hub or nacelle 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the turbomachine 204. It should be appreciated that nacelle 236 may be configured to be supported relative to the turbomachine 204 by a plurality of circumferentially-spaced outlet guide vanes 240. Moreover, a downstream section 242 of the nacelle 238 may extend over an outer portion of the turbomachine 204 so as to define a bypass airflow passage 244 therebetween.

During operation of the turbofan engine 200, a volume of air 246 enters turbofan engine 200 through an associated inlet 248 of the nacelle 238 and/or fan section 202. As the volume of air 246 passes across fan blades 238, a first portion of the air 246 as indicated by arrows 250 is directed or routed into the bypass airflow passage 244 and a second portion of the air 246 as indicated by arrows 252 is directed or routed into the LP compressor 210. The ratio between the first portion of air 250 and the second portion of air 252 is commonly known as a bypass ratio. The pressure of the second portion of air 252 is then increased as it is routed through the high pressure (HP) compressor 212 and into the combustion section 214, where it is mixed with fuel and burned to provide combustion gases 254.

The combustion gases 254 are routed through the HP turbine 216 where a portion of thermal and/or kinetic energy from the combustion gases 254 is extracted via sequential stages of HP turbine stator vanes that are coupled to the outer casing 206 and HP turbine rotor blades that are coupled to the HP shaft or spool 222, thus causing the HP shaft or spool 222 to rotate, thereby supporting operation of the HP compressor 212. The combustion gases 254 are then routed through the LP turbine 218 where a second portion of thermal and kinetic energy is extracted from the combustion gases 254 via sequential stages of LP turbine stator vanes that are coupled to the outer casing 206 and LP turbine rotor blades that are coupled to the LP shaft or spool 224, thus causing the LP shaft or spool 224 to rotate, thereby supporting operation of the LP compressor 210 and/or rotation of the fan 226.

The combustion gases 254 are subsequently routed through the jet exhaust nozzle section 220 of the turbomachine 204 to provide propulsive thrust. Simultaneously, the pressure of the first portion of air 250 is substantially increased as the first portion of air 250 is routed through the bypass airflow passage 244 before it is exhausted from a fan nozzle exhaust section 256 of the turbofan engine 200, also providing propulsive thrust. The HP turbine 216, the LP turbine 218, and the jet exhaust nozzle section 220 at least partially define the core air flowpath 221 for routing the combustion gases 254 through the turbomachine 204.

As described above, the second portion of air 252 is mixed with fuel in the combustion section 214 to produce combustion gases 254. As shown schematically in FIG. 1C, the engine 200 may include a fuel delivery system 260 for providing fuel to the combustion section 214 of the engine 200. The fuel delivery system 260 may include a fuel tank 262 and one or more fuel delivery lines 264, which may form a fuel flowpath from the fuel source (fuel tank 262) to the combustion section 214. In other embodiments, however, that the fuel delivery system 260 may be considered part of a vehicle, such as aircraft 10, in which the engine 200 is installed, rather than as part of the engine 200. Further, it will be understood that, although not described herein, the exemplary aircraft 10 may include a fuel delivery system, such as fuel delivery system 260, for providing fuel to the engines 42, 44, which may or may not be configured as described with respect to engine 200.

It will be appreciated that the exemplary turbofan engine 200 depicted in FIG. 1C is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Moreover, although the exemplary gas turbine engine depicted in FIG. 1C is shown schematically as a direct drive, fixed-pitch turbofan engine 200, in other embodiments, a gas turbine engine of the present disclosure may be a geared gas turbine engine (i.e., including a gearbox between the fan 226 and shaft driving the fan, such as the LP shaft 224), may be a variable pitch gas turbine engine (i.e., including a fan 226 having a plurality of fan blades 228 rotatable about their respective pitch axes P), a mixed-flow turbofan, a turbojet, an un-ducted fan architecture, etc. Further, although not depicted herein, in other embodiments the gas turbine engine may be any other suitable type of gas turbine engine, such as an industrial gas turbine engine incorporated into a power generation system, a marine gas turbine engine, etc. Further still, in alternative embodiments, aspects of the present disclosure may be incorporated into, or otherwise utilized with, any other type of engine, such as reciprocating engines.

Turning now to FIGS. 2A and 2B, the present subject matter also provides a TMS, such as may be used with the engine 200. More particularly, the thermal management system 100 (TMS 100 or system 100) may manage thermal transients of one or more systems and/or apparatus of the engine 200 and/or a vehicle 10 in which the engine 200 is installed. For example, to manage thermal transients, the TMS 100 may be used to cool one or more thermal loads of the engine 200 or a vehicle 10 including the engine 200.

As shown in FIG. 2A, the TMS 100 generally may comprise a coolant flowpath 102 having a coolant C flowing therethrough, a fuel flowpath 104 having a fuel F flowing therethrough, and a coolant-fuel heat exchanger 106 for heat transfer between the coolant C and the fuel F. It will be appreciated that the coolant-fuel heat exchanger 106 may be fluidly connected to both the coolant flowpath 102 and the fuel flowpath 104 to place the coolant C and the fuel F in thermal communication with one another. In the depicted exemplary embodiment, the fuel F (i.e., a mass flow of fuel) is used to cool a thermal load 108 before flowing to a fuel use location 110 that is downstream of the fuel-cooled thermal load 108. The fuel use location 110 may be, e.g., a combustor or combustion section of an engine, such as the combustion section 214 of the engine 200. In other embodiments, the fuel use location 110 may be one or more fuel-driven actuators on the engine 200 and/or vehicle 10, one or more fuel recirculation loops, and/or an afterburner or augmentor.

As further illustrated in FIG. 2A, in some exemplary embodiments, the system 100 also may comprise a cooling system 112 in the coolant flowpath 102 for cooling the coolant C. That is, as depicted in FIG. 2, the cooling system 112 may receive a cooling input 114, e.g., a flow of the coolant C from a coolant source. The coolant C flows through the cooling system 112 to lower its temperature from an input temperature at an inlet 112a of the cooling system 112 to a lower output temperature at an outlet 112b of the cooling system 112. More particularly, the cooling system 112 may be configured to reduce the temperature of the coolant C below a temperature of the fuel F, i.e., the output temperature of the coolant C from the cooling system 112 may be lower than the temperature of the fuel F flowing through the fuel flowpath 104.

The coolant C at the lower output temperature flows from the cooling system outlet 112b and along the coolant flowpath 102 to the coolant-fuel heat exchanger 106. Thus, the TMS 100, via the coolant-fuel heat exchanger 106, thermally couples the cold leg or coolant C output from the cooling system 112 to the fuel flowpath 104. Additionally or alternatively, at least a portion of the coolant C output from the cooling system 112 may flow to a thermal load 116 to cool the thermal load 116. A refrigerant switching valve 118 may be positioned in the coolant flowpath 102 to control the amount of coolant C that flows to the coolant-fuel heat exchanger 106 and/or the coolant-cooled thermal load 116. That is, the refrigerant switching valve 118 may be a flow diverter or a modulating valve that can control a flow split between the coolant-fuel heat exchanger 106 and the coolant-cooled thermal load 116.

Various coolants C may be suitable for use in the TMS 100. In the exemplary embodiment illustrated in FIG. 2A, the cooling system 112 and the coolant flowpath 102 may form a closed loop flowpath. In such embodiments, the cooling system 112 may be a refrigeration system, such as a closed loop vapor-compression system, and the coolant C may be a refrigerant. More particularly, the coolant C may be an inert refrigerant.

In other embodiments, the cooling input 114 is a source of engine bleed air, and the cooling system 112 is an air-based cooling system such as an air cycle machine (ACM). FIG. 2B illustrates an exemplary ACM cooling system 112 utilizing an airflow from the exemplary engine 200. As shown in FIG. 2B, the ACM cooling system 112 may include a fan duct heat exchanger 160, a turbine 162, a cooling load heat exchanger 164, and a compressor 166, with a shaft 168 coupling the turbine 162 to the compressor 166. The fan duct heat exchanger 160 may be positioned in the bypass airflow passage or duct 244 of the engine 200 and may cool a flow of air, e.g., engine bleed air, through heat exchange with another flow of air, i.e., the fan stream (e.g., from the bypass airflow passage 244 of the engine 200). The cooled engine bleed air flows through the turbine 162, which drives the ACM cooling system 112. Next, the air flows through the cooling load heat exchanger 164, where the air is warmed through heat exchange with the coolant C, which has been warmed through heat exchange with the fuel F in the coolant-fuel heat exchanger 106. Thus, in the cooling load heat exchanger 164, the coolant C is cooled by the air flowing through the ACM cooling system 112, such that the coolant C may cool the fuel F through heat exchange in the coolant-fuel heat exchanger 106 as described herein. From the cooling load heat exchanger 164, the air flows to the compressor 166, which is driven by the turbine 162 via shaft 168, where it may be compressed as will be understood by those of ordinary skill in the art. The compressed air may flow back to the fan stream to complete the loop of the ACM cooling system 112.

In some embodiments, the cooling input 114 is a source of engine bleed air such that the coolant C is air. It will be appreciated that, in embodiments where the coolant C is air, the coolant-fuel heat exchanger 106 is a direct air-fuel heat exchanger. In other embodiments, the cooling input 114 may be mechanical shaft power or electrical power. Moreover, in appropriate embodiments, the coolant flowpath 102 may be an open loop, e.g., the coolant C flows through the cooling system 112 and the coolant flowpath 102 to an exhaust location 136 (FIG. 4). Exemplary embodiments of various open loop and closed loop systems and exemplary coolants are described in greater detail below. It will be appreciated that other suitable means of reducing the temperature of the coolant C below the temperature of the fuel F may be used as well.

Refrigeration cycles, such as may be used in and/or driven by the cooling system 112, are most efficient when operated to a constant thermal load because thermal efficiency can drop quickly at part-power conditions. Thus, the cooling system 112 may be operated to a constant cooling or thermal capacity $TC_{cool}$, with the refrigerant switching or diverter valve 118 partitioning that cooling capacity (i.e., a coolant mass flow at a temperature) between the coolant-fuel heat exchanger 106 and the coolant-cooled thermal load 116. As such, the system would functionally be operated to meet the thermal load of 116 at any instance in time with the spare cooling capacity $TC_{cool}$ being used to store cooling capacity in a fuel tank or accumulator 120 as described in greater detail below. The cooling system 112 may be sized against the total cooling demand of the coolant-cooled load 116 and the coolant-fuel heat exchanger 106, and the thermal loads may be optimally partitioned between the coolant loop 102 and the fuel loop 104 for a given application, where the thermal loads on the coolant loop 102 may be referred to as thermal loads $L_{cool}$ and the thermal loads on the fuel loop 104 may be referred to as thermal loads $L_{fuel}$. It will be appreciated that the cooling or thermal capacity $TC_{cool}$ of the coolant C or coolant loop 102 is a measure of the maximum possible heat transfer rate of the coolant C or coolant loop 102.

Keeping with FIGS. 2A and 2B, the system 100 also may comprise a fuel tank 120. The fuel tank 120 may function as an accumulator. More particularly, as shown in FIGS. 2A and 2B, cooled fuel exiting the coolant-fuel heat exchanger 106 may either flow along the fuel flowpath 104 to cool the fuel-cooled thermal load 108 or to be stored in the fuel tank 120 for later use. That is, spare cooling capacity generated by the cooling system 112 may be accumulated in the fuel F stored in the fuel tank 120 for later use, e.g., in response to increased cooling demands. As such, the fuel loop 104 has a fuel system thermal capacity $TC_{fuel}$, which may be understood as a measure of the maximum possible heat transfer rate of the fuel loop 104, e.g., at the fuel-cooled thermal load 108.

For instance, during certain operational modes of the engine 200, e.g., during take-off for an engine 200 of an aircraft, the cooling capacity of the cooling system 112 may be relatively high while the cooling demand, e.g., of the fuel-cooled and/or coolant-cooled thermal loads 108, 116, may be relatively low. More specifically, the power generated by the engine 200 during an operational mode such as aircraft take-off may result in a relatively large or high cooling input 114 and relatively large fuel flow rate, but components of the engine 200 and/or aircraft that require cooling have not yet heated to a level to require much cooling, i.e., cooling demand of typical thermal loads such as thermal loads 108, 116 is relatively low. Receiving the relatively high or large cooling input 114, the cooling system 112 may generate a corresponding cooling capacity in the coolant C flowing through the coolant flowpath 102. That is, an increased cooling input 114 may increase the cooling capacity of the coolant C. However, because the cooling demand is relatively low, the increased cooling capacity could go to waste unless it was stored for later use. Further, it will be appreciated that, during other operational modes of the engine 200, such as cruise or the like, the cooling input 114 may be reduced (e.g., may be relatively low or small compared to the cooling input 114 provided to the cooling system 112 during other operational modes) while the cooling demand, e.g., of the thermal loads 108 and/or 116, may be increased (e.g., may be relatively high or large compared to the thermal load(s) 108, 116 during other operational modes).

Stated differently, the thermal capacity of cooling system 112 generally is proportional to engine power because the cooling system 112 ultimately rejects heat to, e.g., a fan stream or duct such as the bypass airflow passage 244 of the engine 200. Fuel cooling capacity generally is also proportional to engine power because the fuel flow rate is proportional to engine power. However, not all contributors to the fuel-cooled and coolant-cooled thermal loads 108, 116 are proportional to engine power. For example, hot day engine idle may produce excess heat in the engine lubricating oil system because the engine fuel flow is too low to absorb all the oil heat. Further, aircraft systems may utilize a combination of coolant and fuel cooling, but such systems may be electric power generation and/or military mission systems that operate a high heat dissipation levels independent of engine power. Accordingly, a mismatch may arise between cooling capacity and cooling demand, e.g., cooling capacity of the cooling system 112 may be relatively high while the cooling demand of the thermal loads 108, 116 is relatively low and vice versa.

As such, it may be advantageous to store the excess cooling capacity generated during some operational modes for use during other operational modes, e.g., to increase efficiency of the engine 200 and/or vehicle 10 by not letting the excess cooling capacity go to waste and/or to have the needed cooling capacity to meet the cooling demand during periods of decreased cooling generation. As described herein, the fuel F circulating through the system 100 can provide such cooling storage. More specifically, excess cooling capacity may be accumulated in the fuel F circulating within the system 100, and such accumulated cooling capacity may be used during periods of increased cooling demand.

FIGS. 2A and 2B illustrate that the system 100 may include a fuel recirculation valve 122 for controlling the flow of the fuel F between the coolant-fuel heat exchanger 106 and the fuel-cooled thermal load 108. Like the refrigerant switching valve 118, the fuel recirculation valve 122 may be a flow diverter or a modulating valve that can control a flow split between the fuel tank 120 and the fuel-cooled thermal load 108, i.e., the fuel recirculation valve 122 may be positioned in the fuel flowpath 104 to control the amount of fuel F that flows to the fuel tank 120 (which may be referred to as fuel flow $F_{tank}$) and/or the fuel-cooled thermal load 108 (which may be referred to as fuel flow $F_{cool}$). More particularly, the fuel recirculation valve 122 may be fluidly connected to the fuel flowpath 104 upstream of the fuel tank 120 for controlling a flow of the fuel $F_{tank}$ to the fuel tank 120 and/or a flow of the fuel $F_{cool}$ to the fuel-cooled thermal load 108. Further, the refrigerant switching valve 118 may be fluidly connected to the coolant flowpath 102 upstream of the coolant-fuel heat exchanger 106 for controlling a flow of the coolant C to the coolant-fuel heat exchanger 106 and/or to the coolant-cooled thermal load 116.

Thus, using one or both of the valves 118, 122, the flow of fluid provided to cool the thermal loads 108, 116 may be controlled to distribute the respective fluid between the cooling demand (thermal load 108 and/or 116) and/or cooling storage. For example, the refrigerant switching valve 118 may be used to control how much of the coolant C passes from the cooling system 112 to cool the coolant-cooled thermal load 116 or to exchange heat with the fuel F to store the cooling capacity of the coolant in the fuel F. Similarly, the fuel recirculation valve 122 may be used to control how much of the fuel F passes from the coolant-fuel heat exchanger 106 to cool the fuel-cooled thermal load 108 or to the fuel tank 120 to store the fuel F cooled by heat exchange with the coolant C in the coolant-fuel heat exchanger 106.

As an example of a method of operating the system 100 illustrated in FIGS. 2A and 2B, during periods of relatively low cooling demand by the coolant-cooled thermal load(s) 116, the refrigerant switching valve 118 may be fully or substantially closed such that all or nearly all of the coolant C flows to the coolant-fuel heat exchanger 106. Thus, through heat exchange with the fuel F in the coolant-fuel heat exchanger 106, the excess capacity of the cooling system 112 may be stored in the fuel tank 120. During periods of relatively high cooling demand by the coolant-cooled thermal load(s) 116, the refrigerant switching valve 118 may be fully or substantially open such that all or nearly all of the coolant C flows to the coolant-cooled thermal load(s) 116 to cool the load(s) 116. Further, a portion of the heat added to the coolant C by the coolant-cooled thermal load(s) 116 may be rejected to the fuel F by mixing with the outlet flow from the coolant-fuel heat exchanger 106, effectively combining with the stored cooling capacity in the fuel F to offload the cooling system 112.

As discussed above, the exemplary embodiment of the system 100 includes a fuel tank 120. In some embodiments, the fuel tank 120 may be an accumulator for fuel return local to or within the TMS 100. In other embodiments, the fuel tank 120 is an additional or auxiliary fuel tank that is separate from the "main" fuel tank of the engine 200 or vehicle 10. For example, as illustrated in FIGS. 2A and 2B, the fuel F may be provided to the fuel flowpath 104 from the main fuel tank, e.g., fuel tank 262, and the fuel F cooled by the coolant C may be stored in the separate, additional or auxiliary fuel tank 120 disposed in the fuel flowpath 104. More particularly, the fuel F may flow along a fuel line 123 from the main fuel tank 262 to the fuel flowpath 104, e.g., the fuel F from the main fuel tank 262 may enter the fuel flowpath 104 by flowing into the fuel tank 120. A valve 125 may be disposed along the fuel line 123 to control the flow of fuel F from the main fuel tank 262 to the fuel flowpath 104. For instance, the flow rate of the fuel F from the main fuel tank 262 may be modulated, using the valve 125, such that a higher flow rate $F_{use}$ is sent to the fuel use location 110 during periods of higher fuel demand at the fuel use location 110. That is, the valve 125 may be a flow splitting or flow diverter valve, splitting or diverting the flow of fuel F between the fuel use location 110 (e.g., engine burn) and the fuel flowpath 104. In still other embodiments, however, the fuel tank 120 is the main fuel tank.

As further depicted in FIGS. 2A and 2B, the fuel-cooled thermal load 108 may be disposed either upstream or downstream of a flow $F_{use}$ of the fuel from the main fuel tank 262 to the fuel use location 110 controlled by the valve 125. More particularly, as shown in FIG. 2A, the thermal load 108 is disposed downstream of the valve 125, in any position of the valve 125. As depicted in FIG. 2B, the thermal load 108 is disposed upstream of the valve 125 for a flow $F_{use}$ of the fuel from the main fuel tank 262 to the fuel use location 110, without passing through the fuel tank 120 and/or the coolant-fuel heat exchanger 106.

As also illustrated in FIGS. 2A and 2B, a pump 124 may be disposed in the fuel flowpath 104, e.g., for driving the fuel F along the fuel flowpath 104. It will be appreciated that, in at least some embodiments, a pump also may be included in the coolant flowpath 102 to help drive the coolant C along the coolant flowpath 102. The pump 124, as well as any other pump included in the system 100, may have any suitable configuration. For example, the pump 124 may be powered by an electrical input, may be a turbopump (comprising a turbine and a pump), etc.

Moreover, it will be appreciated that, although sometimes described in singular terms, the fuel-cooled thermal load 108 and/or the coolant-cooled thermal load 116 may represent one or more thermal loads in need of cooling by the fuel F and coolant C, respectively. For example, the fuel-cooled thermal load 108 may be two or more systems, components, or the like of the engine 200 and/or vehicle 10 that are cooled by thermal communication with the fuel F. As another example, the coolant-cooled thermal load 116 may be two or more systems, components, or the like of the engine 200 and/or vehicle 10 that are cooled by thermal communication with the coolant C.

Turning now to FIG. 3A, another exemplary embodiment of the TMS 100 is illustrated. As shown in FIG. 3A, the system 100 also may include a thermal transport flowpath 126 having a thermal transport fluid T flowing therethrough, as well as a coolant-transport heat exchanger 128 for heat transfer between the coolant C and the thermal transport fluid T. As such, the coolant-transport heat exchanger 128 may be fluidly connected to both the coolant flowpath 102 and the thermal transport flowpath 126. Moreover, like the fuel F and the coolant C, the thermal transport fluid T may be used to cool a thermal load 130, which may represent one or more thermal loads from systems, components, etc. of the engine 200 and/or vehicle 10 in which the system 100 is used. For example, the transport-cooled thermal load 130 may include an oil tank, a pre-cooler, and/or other such components or systems of an engine and/or vehicle, such as engine 200 and vehicle 10. It will be appreciated that the thermal load 130 may be the same as the thermal load 116, e.g., in embodiments in which the thermal transport loop or flowpath 126 is interposed between the coolant C and the thermal load as a buffer between the two media (such as air and fuel). Further, a pump 132 may be disposed in the thermal transport flowpath 126 to drive the thermal transport fluid T along the thermal transport flowpath 126. The pump 132 may be configured similarly to the pump 124 disposed in the fuel flowpath 104 and described above.

In some embodiments, a cooling system 134, such as a vapor compression system or other cooling system, may be disposed in the thermal transport flowpath 126. Similar to the cooling system 112, the cooling system 134 may lower the temperature of the thermal transport fluid T from an inlet to an outlet of the cooling system 134. In certain embodiments, the cooling system 134 may be used to cool particular components and/or systems of the engine 200 and/or vehicle 10. For instance, the cooling system 134 may be used to cool avionics system(s) of the vehicle 10. In other embodiments, the cooling system 134 may be omitted.

As depicted in FIG. 3A, the transport-cooled thermal load 130 may be in thermal communication with the fuel-cooled thermal load 108. More particularly, some heat transfer may occur between the thermal transport flowpath 126 and the fuel flowpath 104, in which the thermal loads 130, 108 are disposed, to help cool the transport-cooled thermal load 130 and/or the fuel-cooled thermal load 108. Further, the transport-cooled thermal load 130 and the fuel-cooled thermal load 108 may represent the total cooling demand of the engine 200 and/or vehicle 10 in which the system 100 is used. For example, the thermal loads 108, 130 may represent the total aircraft cooling demand for an aircraft in which the system 100 is installed, such as vehicle 10. As such, the thermal transport fluid F and the fuel F may provide cooling for the total thermal load of the aircraft.

Referring now to FIG. 3B, it will be appreciated that, in some embodiments, the coolant-fuel heat exchanger 106 and the coolant-transport heat exchanger 128 may be arranged in series with respect to the coolant flowpath 102 rather than in parallel as shown in FIG. 3A. More particularly, referring to FIG. 3B, the coolant-fuel heat exchanger 106 and coolant-transport heat exchanger 128 may be arranged such that the coolant C passes through one of heat exchanger 106 and heat exchanger 128 before flowing through the other of heat exchanger 106 and heat exchanger 128. A pair of three-way switching valves 115a, 115b may be used to reverse the flow direction of the coolant C with respect to the heat exchangers 106, 128, e.g., depending on the cooling demand of the coolant-cooled thermal load 116 and/or the transport-cooled thermal load 130. For example, during periods of low cooling demand, the first three-way switching valve 115a, which is disposed proximate the coolant-transport heat exchanger 128, is arranged such that the coolant C flows from the cooling system 112 to the coolant-transport heat exchanger 128, and the second three-way switching valve 115b, which is disposed proximate the coolant-fuel heat exchanger 106, is arranged such that the coolant C flows from the coolant-transport heat exchanger 128 to the coolant-fuel heat exchanger 106. It will be appreciated that, in low cooling demand periods, the coolant C may flow through the coolant-transport heat exchanger 128 without substantial loss of cooling capacity and, thus, also may be used to cool the fuel F and accumulate extra cooling system capacity in the fuel tank 120. A coolant pump 137 may be included in the coolant flowpath 102, e.g., for driving the coolant C along the flowpath 102 in a manner similar to the pumps 124, 132 described herein.

Further, during periods of high cooling demand, the three-way switching valves 115a, 115b are arranged such that the coolant C first flows through the coolant-fuel heat exchanger 106 and then to the coolant-transport heat exchanger 128. Thus, in high cooling demand cases, the coolant loop or flowpath 102 may be reversed (compared to low cooling demand cases) to supplement the cooling capacity of the cooling system 112, thereby cooling the coolant C with the cold sink of cold or cool fuel F from the fuel tank 120 before flowing to the coolant-transport heat exchanger 128. Moreover, it will be appreciated that the cooling system or coolant C sink temperature will vary with engine power, independent of the fuel-cooled load 108, coolant-cooled thermal load 116, and/or transport-cooled thermal load 130. Therefore, a "low cooling demand" and a "high cooling demand" may correspond to an engine operational mode (indicative of engine power), and, thus, the cooling capacity of the coolant C, rather than to the actual cooling demand of the thermal loads (e.g., loads 108, 116, 130).

It will be appreciated that the blocks 108, 116, 130 shown in the figures may represent heat exchangers. For example, the fuel-cooled thermal load 108 shown disposed along the fuel flowpath 104 may be a fuel-cooled load heat exchanger for cooling one or more thermal loads by the exchange of heat between the fuel F and a fluid of the thermal load. More particularly, the block 108 in the figures may represent the fuel F cooling a thermal load via heat exchange between the cooler or cold fuel F and the warmer or hot thermal load. Similarly, the block 116 may represent the coolant C cooling a thermal load via heat exchange between the cooler or cold coolant C and the warmer or hot thermal load, and the block 130 may represent the thermal transport fluid T cooling a thermal load via heat exchange between the cooler or cold thermal transport fluid T and the warmer or hot thermal load. Accordingly, while each of the blocks 108, 116, 130 may be referred to as a thermal load, the blocks 108, 116, 130 may represent heat exchangers for the exchange of heat between the respective fluid (fuel F, coolant C, thermal transport fluid T) and another fluid that is warmer or hotter than the respective fluid F, C, T.

Referring now to FIG. 4, in some embodiments, the TMS 100 may comprise the coolant flowpath 102, the fuel flowpath 104, and the thermal transport flowpath 126, as well as the cooling system 112, fuel tank 120, coolant-transport heat exchanger 128, fuel-cooled thermal load 108, and transport-cooled thermal load 130. Each of these components 102, 104, 126, 112, 120, 128, 108, and 130 may be configured as described herein. For example, the coolant-transport heat exchanger 128 may be fluidly connected to both the coolant flowpath 102 and the thermal transport flowpath 126 for heat exchange between the coolant C and the thermal transport fluid T.

The exemplary system 100 depicted in FIG. 4 also includes a fuel-transport heat exchanger 138 for heat transfer between the fuel F and the thermal transport fluid T. The fuel-transport heat exchanger 138 is fluidly connected to both the fuel flowpath 104 and the thermal transport flowpath 126. Further, the system 100 may include a valve 140 positioned upstream of the fuel-transport heat exchanger 138. The valve 140 may control a flow of the thermal transport fluid T between the fuel-transport heat exchanger 138 and the transport-cooled thermal load 130. For example, the valve 140 may be used to bypass the fuel-transport heat exchanger 138 (i.e., to fully stop or substantially eliminate the flow of the thermal transport fluid T to the heat exchanger 130), e.g., when the cooling demand of the transport-cooled thermal load 130 is relatively high. Conversely, the valve 140 may be fully or substantially open, e.g., when the cooling demand of the transport-cooled thermal load 130 is relatively low, to allow the thermal transport fluid T to flow through the fuel-transport heat exchanger 138 and thereby off-load cooling capacity to the fuel loop 104. As such, heat exchange between the thermal transport fluid T and the fuel F in the fuel-transport heat exchanger 138 may regenerate the cooling capacity of the fuel, and such fuel cooling capacity may be accumulated in the fuel tank 120, e.g., for use during a period of relatively high cooling demand by one or more thermal loads 108 and/or 130.

It will be understood that the exemplary system 100 illustrated in FIG. 4 eliminates the direct heat exchange between the fuel F and the coolant C. Such separation between the fuel F and coolant C may prevent safety issues. For example, in some applications, it may be undesirable to place the fuel F in direct heat exchange with an air coolant C. That is, for safety reasons, e.g., stemming from a failed heat exchanger component, a direct air-fuel heat exchanger should be avoided for at least some embodiments. Thus, the configuration depicted in FIG. 4 may allow the use of air as the coolant C while eliminating direct heat exchange between the air and the fuel F by placing the fuel F in direct heat exchange with the thermal transport fluid T. It will be appreciated that the thermal transport fluid T may be a working fluid selected to eliminate safety issues when used in a direct fuel-thermal transport fluid heat exchanger.

Keeping with FIG. 4, the exemplary system 100 is illustrated in parallel with respect to the transport-cooled thermal load 130. However, it will be appreciated that the system 100 also could be arranged in serial flow order. More particularly, the system 100 may be configured such that the coolant-transport heat exchanger 128, the pump 132, the fuel-transport heat exchanger 138, and the transport-cooled thermal load 130 are arranged in series.

In various embodiments, coolant loop 102 of the system 100 may be either an open loop, which exhausts to the exhaust location 136, or a closed loop, omitting exhaust 136. The exhaust 136 may be to the engine and/or vehicle in which the system 100 is used, e.g., to the engine 200 and/or to other heat loads of the vehicle 10. It will be appreciated that the cooling system 112 in such an open loop system as illustrated in FIG. 4 may be an air-based cooling system, such as the exemplary ACM cooling system 112 illustrated in FIG. 2B. For instance, as described with respect to FIG. 2B, a fan duct heat exchanger 160 may be positioned in the bypass airflow passage or duct 244 of the engine 200 and may cool a flow of air, e.g., engine bleed air, through heat exchange with another flow of air, i.e., the fan stream (e.g., from the bypass airflow passage 244 of the engine 200). The cooled engine bleed air flows through the turbine 162, which drives the ACM cooling system 112. Next, the air flows through the cooling load heat exchanger 164, where the air is warmed through heat exchange with the cooling input 114, which is the coolant C (and may be, e.g., engine bleed air) in the embodiment of FIG. 4. Thus, in the cooling load heat exchanger 164, the coolant C is cooled by the air flowing through the ACM cooling system 112, such that the coolant C may cool the thermal transport fluid T through heat exchange in the coolant-transport heat exchanger 128 as described herein. From the cooling load heat exchanger 164, the air flows to the compressor 166, which is driven by the turbine 162 via shaft 168, where it may be compressed as will be understood by those of ordinary skill in the art. The compressed air may flow back to the fan stream to complete the loop of the ACM cooling system 112. Meanwhile, in the exemplary embodiment of FIG. 4, the coolant C flows from the ACM cooling system 112 along the coolant flowpath 102 to the coolant-transport heat exchanger 128 to cool the thermal transport fluid T and then is exhausted at the exhaust location 136.

Turning now to FIGS. 5A and 5B, exemplary embodiments of load balancing of the TMS 100 are illustrated. More particularly, FIG. 5A illustrates an embodiment in which the cooling capacity of the cooling system 112 is relatively low while the cooling demand (e.g., from the fuel-cooled thermal load(s) 108 and/or the transport-cooled thermal load(s) 130) is relatively high, which may be referred to as a high demand/low capacity embodiment. FIG. 5B illustrates an embodiment in which the cooling capacity of the cooling system 112 is relatively high while the cooling demand (e.g., from the fuel-cooled thermal load(s) 108 and/or the transport-cooled thermal load(s) 130) is relatively low, which may be referred to as a low demand/high capacity embodiment. Throughout the figures, including in FIGS. 5A and 5B, the dashed lines represent portions of the relevant flowpath through which little to none of the associated fluid is flowing. That is, the dashed lines in the figures, such as the dashed lines in FIGS. 5A and 5B, may represent portions of the relevant flowpath where a valve has closed off or substantially limited fluid flow to those portions.

Further, the exemplary embodiments depicted in FIGS. 5A and 5B utilize closed-loop cooling cycles, i.e., the coolant flowpath 102 is a continuous loop rather than open with a cooling input 114 and exhaust 136. As such, the cooling system 112 may be a refrigeration cycle and the coolant C may be an inert working fluid, such as carbon dioxide (CO2) or other refrigerant.

As shown in the exemplary high demand/low capacity embodiment of FIG. 5A, the various valves of the system 100 may be used to direct the flow of cooling fluids to meet the cooling demand of the thermal loads 108 and/or 130. More specifically, the fuel F in the fuel tank 120 may be relatively cold, such that the fuel F would be useful in meeting the cooling demand of the fuel-cooled thermal load(s) 108. The fuel flowpath 104 may include the fuel recirculation valve 122 and a fuel cooler bypass valve 142 to direct the flow of fuel F from the fuel tank 120 through the fuel flowpath 104. The fuel cooler bypass valve 142 may allow the fuel F flowing in the fuel flowpath 104 to bypass the coolant-fuel heat exchanger 106, e.g., such that most or substantially all of the fuel F flowing from the fuel tank 120 is directed to the fuel-cooled thermal load(s) 108. Similarly, the fuel recirculation valve 122 may allow most or substantially all of the flow of fuel F in the fuel flowpath 104 to forego recirculation to the fuel tank 120 and, instead, flow to the fuel-cooled thermal load(s) 108 to meet the cooling demand of the thermal load(s) 108.

In other embodiments, the fuel cooler bypass valve 142 may be omitted. For example, the fuel F may flow continuously through the coolant-fuel heat exchanger 106 without any negative impact on the system 100, rendering the fuel cooler bypass valve 142 unnecessary. As such, the fuel cooler bypass valve 142, and its associated fuel cooler bypass leg 104a of the fuel flowpath 104, may be omitted in at least some embodiments.

Further, the coolant flowpath 102 may include the refrigerant switching valve 118, which may allow most or substantially all of the coolant C to bypass the coolant-fuel heat exchanger 106 and flow to the coolant-transport heat exchanger 128. As described herein, through heat exchange in the coolant-transport heat exchanger 128, the coolant C may cool the thermal transport fluid T, which in turn may be used to meet the cooling demand of the transport-cooled thermal load(s) 130. Thus, by directing the flow of coolant C between the coolant-fuel heat exchanger 106 and the coolant-transport heat exchanger 128, the refrigerant switching valve 118 may determine the cooling split between the transport-cooled load(s) 120 and the fuel-cool thermal load(s) 108.

In some embodiments, during the high demand/low capacity operating mode of the system 100 illustrated in FIG. 5A, a relatively small amount of the cooling capacity of the coolant C may be supplied to the fuel F. For instance, the refrigerant switching valve 118 may be in a partially open position to allow a small portion of the flow of coolant C to pass to the coolant-fuel heat exchanger 106, while the bulk or majority of the coolant C flows to the coolant-transport heat exchanger 128. Likewise, in embodiments including the valve 142, the fuel cooler bypass valve 142 may be partially open to allow a small portion of the flow of fuel F to pass to the coolant-fuel heat exchanger 106 for heat exchange with the coolant C. As such, through the coolant-fuel heat exchanger 106, the coolant C may supply some of its cooling capacity to the fuel F. The fuel recirculation valve 122 also may be in partially open position to allow recirculation of the fuel F to the fuel tank 120, e.g., for storage of the fuel F for regeneration of its cooling capacity during a period of low cooling demand and/or for use of the fuel F to meet the cooling demand of the fuel-cooled thermal load(s) 108 if the relatively high cooling demand of such thermal load(s) 108 continues.

Referring now to FIG. 5B, illustrating an exemplary low demand/high capacity embodiment, the various valves of the system 100 may be used to direct the flow of cooling fluids to regenerate the cooling capacity of the fuel F stored in the fuel tank 120. More particularly, the fuel F in the fuel tank 120 may be relatively warm, such that excess cooling capacity generated by the cooling system 112 (which is excess capacity because the cooling demand of the heat load(s) 108, 130 is relatively low) may be passed to the fuel F for storage in the fuel tank 120, e.g., for later use during a period of high cooling demand. Accordingly, unlike the embodiment of FIG. 5A, the fuel recirculation valve 122 and the fuel cooler bypass valve 142 may allow most or substantially all of the fuel F flowing through the fuel flowpath 102 to flow through the coolant-fuel heat exchanger 106 and recirculate back to the fuel tank 120. That is, the fuel cooler bypass valve 142 may be in a closed or substantially closed position to eliminate fuel bypass of the heat exchanger 106. Moreover, the fuel recirculation valve 122 may be in an open or substantially open position to allow most or substantially all of the fuel F, which has been cooled through heat exchange with the coolant C, to flow back to the fuel tank 120. It will be appreciated that the fuel recirculation valve 122 may be in a position to allow a portion of the fuel F to flow to the fuel-cooled thermal load(s) 108 as fuel flow $F_{cool}$, e.g., to meet the relatively low cooling demand of the thermal load(s) 108 and/or to flow to the fuel use location 110 as fuel flow $F_{use}$.

As further illustrated in FIG. 5B, the refrigerant switching valve 118 may be in a position to allow most or substantially all of the coolant C to flow to the coolant-fuel heat exchanger 106 to cool the fuel F and, therefore, pass the cooling capacity of the coolant C to the fuel F. A portion of the coolant C may be allowed to flow to the coolant-transport heat exchanger 128, e.g., to cool the thermal transport fluid T to meet the relatively low cooling demand of the transport-cooled thermal load(s) 130. Accordingly, FIG. 5B depicts an exemplary embodiment in which most or substantially all of the cooling capacity generated by the cooling system 112 is passed to the fuel F, e.g., regenerating the cooling capacity of the fuel F. As such, the cooling capacity generated by the cooling system 112 during periods of relatively low cooling demand need not go to waste but, rather, may be stored in the fuel, e.g., for use during a period of higher cooling demand.

It will be appreciated that, for embodiments in which the system 100 is used with an engine (such as engine 200) or in a vehicle having an engine (such as aircraft 10), the cooling capacity of the cooling system 112 may be determined by the engine power and/or airflow. More particularly, during periods of high engine power and/or airflow, the cooling capacity of the cooling system 112 may be relatively high, but during periods of low engine power and/or airflow, the cooling capacity of the cooling system 112 may be relatively high. For instance, the cooling capacity of the cooling system 112 may be limited by the cooling stream provided by engine bleed air. However, the cooling demand of various engine and/or vehicle systems may not match up with the engine power and/or airflow, e.g., the cooling demand may be relatively high during periods of relatively low engine power and/or airflow. Therefore, the embodiments depicted in FIGS. 5A and 5B provide exemplary configurations of system 100 for meeting the cooling demand of the engine and/or vehicle systems during a given period despite the mismatch in the cooling capacity generated from the engine power and/or airflow during that period. As described above, the cooling capacity generated during high engine power/airflow and low cooling demand may be passed to the fuel F in the system 100 for storage until a period of low engine power/airflow and high cooling demand. Accordingly, the embodiments of FIGS. 5A and 5B illustrate exemplary configurations of the system 100 for balancing the loads on the TMS 100.

Turning now to FIGS. 6A and 6B, in some embodiments, the fuel tank 120 may be used as a heat exchanger, e.g., to eliminate an intermediate heat exchanger from the TMS 100. As discussed above, in some embodiments it may be desirable to isolate the fuel F from direct heat exchange with engine bleed air. Accordingly, the direct fuel tank cooling embodiments illustrated in FIGS. 6A and 6B may be most suitable for use with inert working fluids, e.g., where the coolant C and/or the thermal transport fluid T are inert working fluids. Such working fluids are described in greater detail below and, generally, are working fluids that are not air (e.g., engine bleed air) or the fuel F (e.g., the fuel used in the propulsion system of the engine 200 and/or vehicle 10 as well as in the system 100). It will be appreciated that the exemplary embodiments of FIGS. 6A and 6B illustrate closed coolant loops, and the cooling input 114 and the coolant exhaust 136 are omitted.

Referring particularly to FIG. 6A, a direct fuel cooling embodiment is illustrated in which heat exchange between the coolant C and the fuel F occurs at the fuel tank 120. That is, the fuel tank 120 also may be configured as a heat exchanger, with the capacity to both exchange heat with the coolant C and store fuel F. Thus, the separate coolant-fuel heat exchanger 106 illustrated in, e.g., the exemplary embodiments of FIGS. 2 and 3 may be eliminated. As depicted in FIG. 6A, the fuel tank 120 may be an auxiliary fuel tank that receives fuel from, e.g., the fuel tank 262 of the fuel delivery system 200, which may be referred to as the main fuel tank. The refrigerant switching valve 118 may divide the flow of coolant C into two portions, a first portion and a second portion. The first portion of the coolant C may flow from the cooling system 112 to the fuel tank 120, where the coolant C cools the fuel F through heat exchange with the fuel F. As described herein, to increase the safety of the system 100, the coolant C in such embodiments may be an inert working fluid, such as an inert refrigerant, because of its direct heat exchange relationship with the fuel F.

As further illustrated in the exemplary embodiment of FIG. 6A, the second, remaining portion of the coolant C may flow to the coolant-transport heat exchanger 128 for heat exchange with the thermal transport fluid T as described herein. The fuel F may flow from the fuel tank 120 to the fuel-cooled thermal load(s) 108, e.g., to cool such thermal load(s) 108, before flowing to the fuel use location 110. The thermal transport fluid T may circulate in the thermal transport flowpath 126 to cool the transport-cooled thermal load(s) 130, e.g., with thermal transport fluid T cooled through heat exchange with the coolant C in the coolant-transport heat exchanger 128. As described herein, one or more of the transport-cooled thermal loads 130 may be in thermal communication with one or more of the fuel-cooled loads, e.g., for heat exchange therebetween. The system 100 also may comprise one or more pumps, such as the pump 124 in the fuel flowpath 104 and the pump 132 in the thermal transport flowpath 126, to help drive the relevant fluid along its flowpath.

Referring now to FIG. 6B, an integrated fuel cooling embodiment is illustrated in which heat exchange occurs between the thermal transport fluid T and the fuel F at the fuel tank 120. More particularly, the exemplary embodiment of FIG. 6B may illustrate an air-based cooling system 112, such as an air cycle machine utilizing engine bleed air to generate cooling capacity. Rather than direct heat exchange between the air coolant C and the fuel F, the exemplary system 100 of FIG. 6B employs heat exchange between the thermal transport fluid T and the fuel F at the fuel tank 120. That is, as described with respect to FIG. 6A, the fuel tank 120 also may be configured as a heat exchanger, e.g., the fuel tank 120 may have the capacity to exchange heat with the thermal transport fluid T and to store fuel F. Thus, the fuel tank 120 (or more specifically, the fuel F therein) is cooled by the thermal transport fluid T rather than the coolant C as illustrated in FIG. 6A.

Keeping with FIG. 6B, the exemplary system 100 also may include a second coolant-transport heat exchanger 144. More specifically, the second coolant-transport heat exchanger 144 may be disposed in the thermal transport flowpath 126 downstream of the transport-cooled load(s) 130. As depicted in FIG. 6B, the thermal transport fluid T may exchange heat with the coolant C in the second coolant-transport heat exchanger 144, i.e., the thermal transport fluid T may be cooled by the coolant C. Then, the thermal transport fluid T may flow to the fuel tank 120, which is configured as a heat exchanger as described above, for heat exchange with the fuel F, i.e., the thermal transport fluid T may cool the fuel F. From the fuel tank 120, the thermal transport fluid T may flow to the first coolant-transport heat exchanger 128 for heat exchange with the coolant C before flowing to the transport-cooled thermal load(s) 130 to cool the thermal load(s) 130, i.e., the thermal transport fluid T may be cooled by the coolant C before flowing to the thermal load(s) 130 to meet the cooling demand of the thermal load(s) 130. Thus, as illustrated in the exemplary embodiment of FIG. 6B, the second coolant-transport heat exchanger 144 may be disposed between the coolant flowpath 102 and the fuel flowpath 104 to transfer the cooling capacity of the coolant C to the fuel F via the thermal transport fluid T. As further depicted in FIG. 6B, using the refrigerant switching valve 118, the flow of coolant C may be split between the first coolant-transport heat exchanger 128 and the second coolant-transport heat exchanger 144, which may degrade the capacity of the coolant-transport heat exchanger 128. However, any degradation in the heat exchange capacity may be offset by heat exchange between the transport-cooled thermal load(s) 130 and the fuel-cooled thermal load(s) 108 and/or by heat exchange at the second coolant-transport heat exchanger 144.

The exemplary embodiments of FIGS. 6A and 6B have the first coolant-transport heat exchanger 128 and the fuel cooling via heat exchange at fuel tank 120 in parallel. Turning to FIGS. 7A and 7B, the exemplary direct fuel cooling TMS 100 also may be arranged in series. For instance, as shown in the exemplary embodiment of FIG. 7A, the fuel F may be cooled, via heat exchange with the coolant C at the fuel tank 120, upstream of the coolant-transport heat exchanger 128. More particularly, rather than substantially simultaneously flowing to the heat exchanger at the fuel tank 120 and the coolant-transport heat exchanger 128 as depicted in FIG. 6A, the coolant C first flows to the fuel tank 120 heat exchanger and then flows to the coolant-transport heat exchanger 128.

FIG. 7B illustrates a coolant bypass line 102a of the coolant flowpath 102, which may allow modulation of the flow of the coolant C to the heat exchanger at the fuel tank 120. For example, using the regenerator modulation valve 146 disposed in the coolant flowpath 102, the coolant C may be allowed to flow to the fuel tank 120, e.g., at a flow rate determined by the degree to which the valve 146 is open or closed, or may be substantially prohibited from flowing to the fuel tank 120. The flow of the coolant C may be modulated based on, e.g., the cooling demand of the fuel-cooled and/or transport-cooled thermal loads 108, 130.

Thus, FIGS. 7A and 7B depict exemplary embodiments in which the fuel tank 120 may be constantly cooled (i.e., the flow of coolant C to the fuel tank 120 may be unregulated as shown in FIG. 7A) or in which the cooling of the fuel tank 120 is modulated (e.g., using the regenerator modulation valve 146 and coolant bypass line 102a as shown in FIG. 7B). It will be appreciated that, as used herein, the term "cooling the fuel tank 120" or the like more specifically refers to cooling of the fuel F through heat transfer with a working fluid such as the coolant C and/or the thermal transport fluid T. As described herein, the fuel F may be cooled through heat exchange with one or more working fluids, and the cooling capacity imparted to the fuel F may be stored and/or accumulated in the fuel tank 120. As such, "cooling the fuel tank 120" may denote the accumulation of cooling capacity in the fuel tank 120.

Referring now to FIGS. 8A and 8B, exemplary embodiments of fuel-transport capacity sharing will be described in greater detail. As discussed herein, cooling capacity may be accumulated and/or stored in the fuel F, e.g., for use during periods when the cooling demand is relatively high but the cooling capacity of the working fluids such as the coolant C and/or the thermal transport fluid T is relatively low. FIGS. 8A and 8B illustrate an exemplary embodiment of the TMS 100 in which the fuel-transport heat exchanger 138 is disposed downstream of the coolant-transport heat exchanger 128, which may further cool the thermal transport fluid T, e.g., if the fuel F is cooler than the coolant C discharged from the cooling system 112 and the cooling demand of the transport-cooled thermal load(s) 130 is greater or larger than the cooling demand of the fuel-cooled thermal load(s) 108. More particularly, FIG. 8A illustrates an exemplary embodiment in which fuel F is discharged from the fuel tank 120 when the cooling capacity of the cooling system 112 is relatively low relative to cooling demand. FIG. 8B illustrates an exemplary embodiment of fuel tank cooling/regeneration when the cooling capacity of the cooling system 112 is relatively high relative to cooling demand. The exemplary embodiments of FIGS. 8A and 8B illustrate closed coolant loops, and the cooling input 114 and the coolant exhaust 136 are omitted.

Referring particularly to FIG. 8A, to help meet the relatively high cooling demand, the coolant C may bypass the fuel tank 120 (where the coolant C would otherwise exchange heat with the fuel F), e.g., through modulation of the regenerator modulation valve 146. All or substantially all of the coolant C may thus flow to the coolant-transport heat exchanger 128, bypassing the fuel tank 120 via the coolant bypass line 102a, such that cooling capacity may be transferred from the coolant C to the thermal transport fluid T. Further, the fuel F may flow to the fuel-transport heat exchanger 138 such that cooling capacity accumulated in the fuel F may be transferred to the thermal transport fluid T. Thus, the thermal transport fluid T may be cooled through heat exchange with the coolant C and/or the fuel F to help meet the cooling demand of the transport-cooled thermal load(s) 130.

As shown in FIG. 8A, a transport modulation valve 148 may be disposed in the thermal transport flowpath 126 upstream of the fuel-transport heat exchanger 138 to modulate the flow of the thermal transport fluid T between the fuel-transport heat exchanger 138 and the transport-cooled thermal load(s) 130. For instance, the transport modulation valve 148 may be used to direct all or substantially all of the thermal transport fluid T to the fuel-transport heat exchanger 138 for heat exchange with the fuel F. Moreover, a fuel modulation valve 150 may be disposed in the fuel flowpath 104 upstream of the fuel-transport heat exchanger 138 to modulate the flow of the fuel F to the fuel-transport heat exchanger 138. For example, as shown in FIG. 8A, the fuel modulation valve 150 may be used to direct all or substantially all of the fuel F to the fuel-transport heat exchanger 138 for heat exchange with the thermal transport fluid T. Accordingly, the valves 148, 150 may help place the thermal transport fluid T in thermal communication with the fuel F for cooling capacity sharing between the fuel F and thermal transport fluid T.

Turning to FIG. 8B, when the cooling demand is relatively low, excess cooling capacity may be transferred to the fuel F for accumulation of the cooling capacity in the fuel tank 120, e.g., until the excess cooling capacity is needed during a period of higher cooling demand. Unlike the embodiment of FIG. 8A, to transfer cooling capacity to the fuel F, the regenerator modulation valve 146 directs the flow of the coolant C to the fuel tank 120 for heat exchange with the fuel F. That is, the coolant C may be directed from the cooling system 112 to the fuel tank 120 to cool the fuel F through heat exchange with the fuel F in the fuel tank 120 heat exchanger. Further, the transport modulation valve 148 and the fuel modulation valve 150 may direct the thermal transport fluid T and the fuel F, respectively, away from the fuel-transport heat exchanger 138. More specifically, the fuel-transport heat exchanger 138 may be bypassed by both the thermal transport fluid T and the fuel F to avoid heat exchange between the thermal transport fluid T and the fuel F. As shown in FIG. 8B, the transport modulation valve 138 may direct the thermal transport fluid T to a transport bypass line 126a, which bypasses the fuel-transport heat exchanger 138 such that the thermal transport fluid T may flow from the coolant-transport heat exchanger 128 to the transport-cooled thermal load(s) 130. Thus, during periods of relatively low cooling demand, the cooling capacity of the coolant C may be passed to the fuel F, e.g., for storage and/or accumulation in the fuel tank 120 for periods of higher cooling demand and/or lower cooling generation by the cooling system 112.

Referring now to FIGS. 9A and 9B, exemplary embodiments of coolant-fuel capacity sharing of the TMS 100 will be described in greater detail. Similar to FIG. 8A, FIG. 9A illustrates a low cooling capacity relative to cooling demand embodiment, where cool or cold fuel is discharged from the fuel tank 120 to help meet the cooling demand. Like FIG. 8B, FIG. 9B illustrates a high cooling capacity relative to cooling demand embodiment, where regeneration of cold/cool fuel occurs, i.e., the fuel F is cooled and stored in the fuel tank 120 for later use (e.g., for use during a period of high cooling demand). The exemplary embodiments of FIGS. 9A and 9B illustrate closed coolant loops, and the cooling input 114 and the coolant exhaust 136 are omitted.

As shown in FIGS. 9A and 9B, heat exchange may occur between the coolant C and the fuel F at both the coolant-fuel heat exchanger 106 and the fuel tank 120. Further, both heat exchangers, i.e., the coolant-fuel heat exchanger 106 and the fuel tank 120, may be positioned downstream of the cooling system 112 and upstream of the coolant-transport heat exchanger 128. Referring particularly to FIG. 9A, when the cooling demand is relatively high compared to the cooling capacity, the fuel tank 120 may be isolated from heat exchange with the coolant C through manipulation of the refrigerant switching valve 118 in the coolant flowpath 102. As such, all or substantially all of the coolant C may flow to the coolant-fuel heat exchanger 106 for heat exchange with the fuel F. It will be appreciated that the fuel F may have excess cooling capacity stored and/or accumulated therein and the cooling capacity of the cooling system 112 may be relatively low, such that the fuel F imparts cooling capacity to the coolant C through heat exchange in the coolant-fuel heat exchanger 106. The fuel F may then flow to the fuel-cooled thermal load(s) 108, e.g., to meet the cooling demand of such loads.

From the coolant-fuel heat exchanger 106, the coolant C, which may have been cooled by the fuel F as described above, may flow to the coolant-transport heat exchanger 128 for heat exchange with the thermal transport fluid T. It will be understood that the coolant C may cool the thermal transport fluid T through heat exchange with the thermal transport fluid T in the coolant-transport heat exchanger 128. The coolant C may then cycle back to the cooling system 112, while the thermal transport fluid T may flow along the transport flowpath 126 to the transport-cooled thermal load(s) 130, e.g., to meet the cooling demand of the thermal load(s) 130, before cycling back to the coolant-transport heat exchanger 128.

Turning to FIG. 9B, during periods of relatively low cooling demand, the coolant C may have excess cooling capacity, which could go to waste unless stored or accumulated, e.g., in the fuel F as described herein. As such, the exemplary embodiment of FIG. 9B illustrates that the refrigerant switching valve 118 and fuel modulation valve 150 may be used to modulate the flows of the coolant C and the fuel F such that the excess cooling capacity may be accumulated in the fuel tank 120. As depicted in FIG. 9B, the refrigerant switching valve 118 directs the flow of the coolant C to the fuel tank 120, where heat exchange between the coolant C and the fuel F cools the fuel F, and the cooled fuel F may be stored and/or accumulated in the fuel tank 120. From the fuel tank 120, the coolant C may flow to the coolant-transport heat exchanger 128. The fuel modulation valve 150 may direct the flow of fuel F from the fuel tank 120, which may be relatively low if the cooling demand of the fuel-cooled thermal load(s) 108 is relatively low, to the fuel-cooled thermal load(s) 108. In some embodiments, the flow rate of the fuel F from the fuel tank 120 to the fuel-cooled thermal load(s) 108 may be dictated by the amount of fuel required at the fuel use location 110, e.g., sufficient fuel F to meet a fuel burn requirement at the fuel use location 110 may flow from the fuel tank 120 while the remainder of the fuel F is stored/accumulated in the fuel tank 120. Thus, each of the coolant C and the fuel F may bypass the coolant-fuel heat exchanger 106. In this way, the cooling capacity generated by the cooling system 112 during periods of relatively low cooling demand by the transport-cooled thermal load(s) 130 and/or the fuel-cooled thermal load(s) 108 may be stored and/or accumulated in the fuel F held in the fuel tank 120.

It will be appreciated that the foregoing descriptions of the system 100 also may be understood as describing one or more methods of operating the system 100, e.g., for storing and/or accumulating cooling capacity in fuel of a vehicle. For example, referring to FIG. 3A, an exemplary method of operating the system 100 may include directing a flow of a coolant C to a coolant flowpath 102 and flowing the coolant C along the coolant flowpath 102. The method also may include operating a cooling system 112 disposed in the coolant flowpath 102 to cool the coolant C. As further illustrated in FIG. 3A, the method may include flowing a fuel F through a fuel flowpath 104, and the fuel flowpath 104 may include a fuel tank 120 for accumulating the fuel F. As described herein, flowing the fuel F may include pumping the fuel F, where the fuel F may be pump or induced to flow through the fuel flowpath 104 by the pump 124 shown in FIG. 3A.

Moreover, the method of operating the TMS 100 FIG. 3A may include controlling the flow of the coolant C to a coolant-fuel heat exchanger 106 and passing both the coolant C and the fuel F through the coolant-fuel heat exchanger 106. As depicted in FIG. 3A, the coolant-fuel heat exchanger 106 may be disposed such that both the coolant flowpath 102 and the fuel flowpath 104 pass therethrough. Accordingly, the method may include utilizing the refrigerant switching valve 118 to modulate or control the flow of coolant C between the coolant-fuel heat exchanger 106 and the coolant-transport heat exchanger 128 as described herein.

The method further may include controlling the flow of the fuel F from the coolant-fuel heat exchanger 106 such that the fuel F flows to the fuel tank 120, e.g., for accumulation and/or storage of the cooled fuel F therein, and/or to one or more fuel-cooled thermal loads 108, e.g., for cooling such loads. As described herein, using the fuel recirculation valve 122, the fuel F may flow to either the fuel tank 120 or the fuel-cooled thermal load(s) 108 or the valve 122 may direct a portion of the fuel F to the fuel tank 120 and the remainder of the fuel F to the fuel-cooled thermal load(s) 108. Further, the operating method illustrated in FIG. 3A may include flowing the fuel F from the fuel-cooled thermal load(s) 108 to a fuel use location 110.

As depicted in FIG. 3A, the method also may include flowing a thermal transport fluid T along a thermal transport flowpath 126. Moreover, the method may include flowing the coolant C to a coolant-transport heat exchanger 128 and flowing the thermal transport fluid T to the coolant-transport heat exchanger 128, where the coolant-transport heat exchanger 128 is disposed such that both the coolant flowpath 102 and the thermal transport flowpath 126 pass therethrough. As further illustrated in FIG. 3A, the method also may include flowing the thermal transport fluid T to one or more transport-cooled thermal loads 130, e.g., for cooling such loads.

Although detailed above with respect to FIG. 3A, it will be appreciated that a method of operating a TMS 100 may be described with respect to each of various exemplary TMS 100 described herein and illustrated in the figures. That is, the method may vary according to the various embodiments of the TMS 100 shown in FIGS. 2-9B, but a method of operation may be understood with respect to each of the various embodiments. Generally, each method of operating the respective TMS 100 may include operating the cooling system 112 to provide extra cooling capacity with respect to the various thermal loads at various operating conditions, e.g., of an engine and/or vehicle. The extra cooling capacity may be used to cool the fuel F, which may be accumulated in the fuel tank 120, e.g., to provide needed cooling capacity for the various thermal loads during operating conditions when the cooling system 112 cannot supply the needed cooling capacity.

As described herein, the fuel F that enters the system 100 does not return to its source; the fuel F that enters the fuel flowpath 104 either recirculates through the fuel flowpath 104 or flows to the fuel use location 110, e.g., for engine burn. As such, the fuel flow $F_{cool}$ to the fuel-cooled thermal load 108 equals the fuel flow $F_{use}$ to the fuel use location 110, i.e., the fuel F flows from the fuel-cooled thermal load 108 to the fuel use location 110 such that $F_{cool}=F_{use}$. Further, as shown, e.g., in FIGS. 2A and 2B, at least a portion of the fuel flow from the main fuel tank 262 into the system 100 may be diverted by the valve 125 to the fuel use location 110, as fuel flow $F_{use}$, without passing through the fuel loop 104. Thus, a total fuel flow $F_{total}$ the system 100 is the sum of the fuel flow $F_{tank}$ to the fuel tank 120 and the fuel flow of $F_{cool}$ to the thermal load 108 or the fuel flow $F_{use}$ to the fuel use location 110, i.e., $F_{total}=F_{tank}+F_{cool}$ or $F_{total}=F_{tank}+F_{use}$. For fuel flows within the system 100, a fuel split between $F_{tank}$ and $F_{use}$ may be a 1:1 ratio, a 2:1 ratio, or any other appropriate split of the total fuel flow $F_{total}$ between fuel flow $F_{tank}$ to the fuel tank 120 and the fuel flow $F_{use}$ to the fuel use location 110.

Moreover, as described herein, the fuel tank 120 is charged or accumulates fuel F when the cooling capacity $TC_{cool}$ exceeds the cooling load $L_{cool}$. That is, the fuel flow $F_{tank}$ to the fuel tank 120 is greater than zero (0) when the cooling capacity $TC_{cool}$ exceeds the cooling load $L_{cool}$ such that $F_{tank}>0$ when $TC_{cool}>L_{cool}$. Further, charging the fuel tank 120 means more fuel F is going to the fuel tank 120 than to the fuel use location 110, i.e., the ratio of the fuel flow $F_{tank}$ to the fuel flow $F_{use}$ is greater than one (1) when the cooling capacity $TC_{cool}$ exceeds the cooling load $L_{cool}$, or $F_{tank}/F_{use}>1$ when $TC_{cool}>L_{cool}$. Conversely, the fuel tank 120 is discharged, or cooled fuel F flows from the fuel tank 120, when the fuel cooling or thermal load $L_{fuel}$ exceeds the fuel cooling or thermal capacity $TC_{fuel}$. That is, the fuel flow $F_{tank}$ is less than zero (0), representing the fuel flow from the fuel tank 120, when the thermal load $L_{fuel}$ is greater than the fuel thermal capacity $TC_{fuel}$ such that $F_{tank}<0$ when $TC_{fuel}<L_{fuel}$. Additionally, discharging the fuel tank 120 means more than half or 50% of the fuel flow $F_{use}$ is flowing from the fuel tank 120, i.e., the ratio of the fuel flow $F_{tank}$ to the fuel flow $F_{use}$ is less than −50% (negative fifty percent, where the negative value indicates fuel flow from or out of the fuel tank 120) when the fuel thermal load $L_{fuel}$ exceeds the fuel thermal capacity $TC_{fuel}$, or $F_{tank}/F_{use}>-0.50$ when $L_{fuel}>TC_{fuel}$. As described herein, one or more valves, such as valves 122, 125, may be modulated to control the flow of the fuel F to the fuel tank 120 and the fuel use location 110. Thus, one or more valves, e.g., valves 122, 125, may be positioned to control the fuel flow F such that $F_{tank}/F_{use}>1$ when $TC_{cool}>L_{cool}$ and may be positioned to control the fuel flow F such that $F_{tank}/F_{use}>-0.50$ when $L_{fuel}>TC_{fuel}$.

As further described herein, a thermal load $L_{cool}$ on the coolant loop 102 is independent of a thermal load $L_{fuel}$ on the fuel loop 104, e.g., the thermal loads may be oil cooling, avionics/electronics, vehicle environment control, etc. However, the thermal capacity $TC_{cool}$ of the coolant loop 102 may not be independent from the thermal capacity $TC_{fuel}$ of the fuel loop 104, e.g., because the engine 200 (which burns the fuel F) is also the powerplant for the vehicle 10 and provides energy or mass flow input to the coolant system 112 of the coolant loop 102. Moreover, the fuel cooling or thermal capacity $TC_{fuel}$ depends on the fuel flow $F_{use}$ to the fuel use location 110 (e.g., a burn flow rate of the fuel F) and the fuel supply temperature.

In at least some embodiments of the system 100 depicted in the figures, a valve, and in some instances additional fluid conduit, is included to bypass each heat exchanger and/or other components of the system 100. However, it will be appreciated that, in some embodiments, minimizing valves and/or conduit may be desirable. For example, a reduced number of valves and/or conduit may reduce the complexity, weight, etc. of the system 100. Reduced system complexity may offer manufacturing, installation, and service advantages (such as decreased time and cost of manufacturing, installation, and/or servicing, as well as requiring a smaller envelope for installation compared to more complex systems). Reduced weight may offer advantages such as increased engine efficiency, decreased fuel burn requirements, etc. Accordingly, for at least some embodiments, the numbers of valves and/or conduits may be optimized, e.g., such that a bypass line is not provided for every heat exchanger but the respective fluids are allowed to flow through the respective heat exchanger. As one example, in some embodiments, the fuel cooler bypass valve 142 illustrated in FIGS. 5A and 5B, along with the fuel cooler bypass line 104a of the fuel flowpath 104, may be omitted, with the fuel F instead always passing through the coolant-fuel heat exchanger 106.

Further, in some embodiments, the system 100 may include a control system 300, e.g., for opening and/or closing the one or more valves 118, 122, 140, 142, 146, 148, 150 that may be included in the respective configuration of the system 100 and/or for modulating a pump speed of the one or more pumps 124, 132 that may be included in the system 100. An exemplary control system 300 is illustrated in FIG. 2. It will be appreciated that any of the embodiments of the system 100 depicted in FIGS. 3-9B also may include the control system 300. Moreover, the valves 118, 122, 140, 142, 146, 148, 150 and/or pumps 124, 132 may be controlled in other ways as well. For example, in appropriate embodiments, one or more of the valves 118, 122, 140, 142, 146, 148, 150 may be passively actuated, e.g., by a temperature and/or pressure within the system 100 and/or external to the system 100. Thus, the one or more valves 118, 122, 140, 142, 146, 148, 150 of the system 100 may be referred to as an active system (e.g., controlled by the control system 300 or other actuation system or component) or a passive system (e.g., passively actuated as described) for controlling fluid flow (e.g., the flow of the coolant C and/or the flow of the fuel F) in the system 100.

As shown in FIG. 2, the exemplary control system 300 includes a controller 302, with the controller 302 being operably connected to each of the valves 118, 122, as well as the pump 124. Specifically, the controller 302 generally includes a network interface 304. The network interface 304 may be operable with any suitable wired or wireless communications network for communicating data with other components of, e.g., the TMS 100, the engine 200, and/or other components or systems not depicted. As is illustrated using phantom lines, for the exemplary embodiment of FIG. 2, the network interface 304 utilizes a wireless communication network 306 to communicate data with other components. More particularly, through the network interface 304 of the controller 302 and the wireless communication network 306, the controller 302 may be operably coupled to each of the one or more valves 118, 122, 140, 142, 146, 148, 150 and/or pumps 124, 132 included in the particular embodiment of the system 100. It will be appreciated, of course, that although the network interface 304 utilizes the wireless communication network 306 for the exemplary embodiment of FIG. 2, in other embodiments, the network interface 304 may instead utilize a wired communication network or a combination of wired and wireless communication networks.

Referring still to FIG. 2, the controller 302 further includes one or more processors 308 and memory 310. The memory 310 stores data 312 and instructions 314 accessible by the one or more processors 308. The one or more processor(s) 208 can include any suitable processing device, such as a microprocessor, microcontroller, integrated circuit, logic device, and/or other suitable processing device. The one or more memory device(s) 310 can include one or more computer-readable media, including, but not limited to, non-transitory computer-readable media, RAM, ROM, hard drives, flash drives, and/or other memory devices. The instructions 314, when executed by the one or more processors 308, cause the control system 300 to perform functions. The instructions 314 within the memory 310 can be any set of instructions that, when executed by the one or more processors 308, cause the one or more processors 308 to perform operations, such as one or more of the operations described herein. In certain exemplary embodiments, the instructions 314 within the memory 310 can be software written in any suitable programming language or can be implemented in hardware. Additionally and/or alternatively, the instructions can be executed in logically and/or virtually separate threads on processors 308. The memory devices 310 can further store other data 314 that can be accessed by the processors 308.

In such a manner, it will be appreciated that in at least certain exemplary embodiments, the controller 302 may be configured to receive data from one or more sensors and/or components and may control operations of the TMS 100 in response to the data received from the one or more sensors and/or components. For example, the exemplary controller 302 may be configured to operate the refrigerant switching valve 118 in response to data received from a coolant-cooled thermal load 116 and/or a fuel-cooled thermal load 108 (e.g., increase a flow of coolant C to the coolant-cooled thermal load 116 in response to receiving data indicative of an increased cooling demand by the coolant-cooled thermal load 116). Additionally and/or alternatively, the exemplary controller 302 may be configured to operate the fuel pump 124 in response to receiving data indicative of a fuel flow needed at the fuel use location 110. The controller 302 may use other data to control the one or more valves and/or one or more pumps of the particular configuration of the system 100, with various exemplary configurations of the system 100 illustrated in FIGS. 2-9B.

In some embodiments, the control system 300 and/or the controller 302 may be part of automated digital controls (e.g., a Full Authority Digital Engine Control (FADEC) on an aircraft) that control one or more aspects of an engine, such as engine 200. For example, the controller 302 may be, e.g., an Electronic Engine Controller (EEC) or Electronic Control Unit (ECU) of a FADEC, and in addition to the functions described herein, may control fuel flow, engine geometries, and other parameters to optimize performance of the engine 200 during operation, such as during takeoff, flight, and landing for an aircraft. Various parameters, such as the state of flight, state of aircraft systems, and pilot commands, may be communicated using digital signals from a system, such as an avionics system, to the controller 302. As described herein, the controller 302 may include various components for performing various operations and functions, such as the one or more processors 308 and one or more memory devices 310. In other embodiments, the controller 302 may perform the specific functions described herein, and one or more other controllers may control various parameters to optimize performance of the engine 200 other than those specific functions.

It will be appreciated that the fuel F may be any suitable or appropriate fuel, e.g., for use in the engine 200 and/or vehicle 10. For example, in some embodiments, the fuel may be jet fuel or jet propellant (JP). In further embodiments, the fuel may be cryogenic or near-cryogenic, e.g., when the engine 100 is a hypersonic propulsion engine and/or the vehicle 200 is a hypersonic vehicle.

Further, the coolant C may be any suitable or appropriate coolant for use in the cooling system 112. For example, the cooling system 112 module of the system 100 may be a refrigeration cycle, and the coolant C may be a refrigerant. In other embodiments, as described herein, the system 100 may be an open system utilizing air, such as bleed air from the engine 200 and/or vehicle 10, as the coolant C in the cooling system 112, and the air coolant may enter the system 100 and be exhausted from the system 100 rather than continuous cycling through the system 100 in a coolant flowpath loop 102.

Moreover, in some embodiments, the working fluids—the coolant C and the thermal transport fluid T—used in the system 100 may depend on the fuel F and/or each other, e.g., a certain coolant C may be selected for use in the coolant-transport heat exchanger 128 with a certain thermal transport fluid T. Generally, each working fluid, i.e., each of the coolant C and the thermal transport fluid T (when used in the system 100), may be a fire-suppressant fluid, e.g., to enable a layer of redundancy in the system 100, protecting against a volatile mix of the fuel F and working fluid C, T flowing in the respective coolant flowpath 102 and thermal transport flowpath 126. Example working fluids C, T may include, but are not limited to, the following: thermal oils; supercritical fluids such as supercritical carbon dioxide ($sCO_2$); liquid metals; standard industry refrigerants (R-###ANSI/ASHRAE designation), e.g., R-410a; and noble gases, which also carry refrigerant designations. As an example, where the fuel F is liquid hydrogen fuel (LH2 or the refrigerant designation R-702), the coolant C and/or thermal transport fluid T may be helium (R-704) or neon (R-720) and, more particularly, may be supercritical helium, subcooled liquid neon, transcritical neon, or supercritical neon. As another example, where the fuel F is methane (R-50), the coolant C and/or thermal transport fluid T may be nitrogen (R-728), argon (R-740), or krypton (R-784). More particularly, the working fluid C, T in the respective coolant flowpath 102 and thermal transport flowpath 126 may be transcritical or supercritical nitrogen, transcritical or supercritical argon, or subcooled liquid krypton, transcritical krypton, or supercritical krypton. As yet another example, where the fuel F is jet fuel or jet propellant (JP), the coolant C and/or thermal transport fluid T may be pentafluoroethane (R-410a) fire extinguishing media, a near azeotropic mixture of difluoromethance (R-32) and pentafluoroethane (R-125), carbon dioxide (CO2 or R-744), or a binary gas compound, such as xenon plus another gas. More particularly, the coolant C and/or thermal transport fluid T may be supercritical pentafluoroethane or supercritical carbon dioxide ($sCO_2$). Further, a fire-suppressing working fluid C, T, such as supercritical carbon dioxide, may be selected for fuel inerting or for otherwise suppressing a fire in the event of a leak or other failure in which the fuel F and working fluid C, T could come into contact or mix together. Other working fluids C, T for use in the respective flowpath 102, 126 may be used as well.

Moreover, it will be appreciated that, although described with respect to the vehicle 10 and gas turbine engine 200, the thermal management system 100 described herein may have other applications. That is, the system 100 is not limited to use with a gas turbine engine and/or a vehicle such as an aircraft. For example, in some embodiments, the system 100 may be incorporated into any other suitable aeronautical propulsion system, such as a hypersonic propulsion system, a turbofan engine, a turboshaft engine, a turboprop engine, a turbojet engine, a ramjet engine, a scramjet engine, etc., or combinations thereof, such as combined-cycle propulsion systems. Further, in certain embodiments, the system 100 may be incorporated into a non-aeronautical propulsion system, such as a land-based power-generating propulsion system, an aero-derivative propulsion system, etc. Further still, in certain embodiments, the system 100 may be incorporated into any other suitable propulsion system or vehicle, such as a manned or unmanned aircraft, etc.

Accordingly, the present subject matter provides thermal management systems (TMS) utilizing heat exchange between at least one working fluid and a fuel to accumulate cooling capacity in the fuel, e.g., during periods of relatively high cooling generation and relatively low cooling demand, and to extract cooling capacity from the fuel, e.g., during periods of relatively low cooling generation and relatively high cooling demand. For example, a TMS of an aircraft may be configured such that extra cooling capacity, available when a main load cooling demand is relatively low and fan duct cooling capacity (i.e., bleed air cooling capacity) is relatively high, is offloaded to a fuel tank or vessel, effectively using the aircraft fuel for thermal energy storage. As described herein, the TMS may incorporate a cooling system that is tied to, e.g., an operating condition of an engine (e.g., engine power, etc.) such that the cooling capacity of the cooling system varies, and the variable cooling capacity may not correspond to the cooling demand of one or more systems cooled via the TMS. The embodiments of the TMS described herein thus capture the cooling capacity of the cooling system when the cooling capacity is readily available and store the cooling capacity for use when the cooling capacity is not as readily available yet the cooling demand is relatively high. As such, any excess cooling capacity may be used for cooling a fuel tank or vessel rather than trying to balance heat generation and heat sink capacities in a steady state sense (e.g., instead of balancing aircraft heat generation and engine heat sink capacities).

In some embodiments, thermal transport fluid or bus loops or thermal transport capacity may be reduced by shifting loads otherwise cooled by the thermal transport loop to the fuel system. More particularly, compared to a typical allocation of heat loads between transport- or bus-cooled loads and fuel-cooled loads, more loads may be cooled by the fuel flowing through the fuel flowpath of the TMS described herein. Thus, less or reduced cooling capacity may be required by the thermal transport flowpath, which may increase the efficiency of the system, reduce the complexity of the system, etc. Additionally or alternatively, the exemplary systems described herein may extend fuel-cooled architecture on the lower end to increase capacity for lower temperature heat generation.

As described herein, the cooling system may utilize air, a refrigerant, supercritical carbon dioxide ($sCO_2$), etc. as a coolant. The cooling system may be either an open or a closed loop; a closed loop may provide more constant capacity operation and may not require moisture management, but an open loop may be useful for some embodiments, such as when it is desirable to use air as the coolant. The cooling system may run or be operated whenever possible, e.g., to keep cooling the fuel such that more heat may be transferred to or put into the fuel during periods of high cooling demand.

As further described herein, the fuel tank to which the excess cooling capacity is offloaded may function as accumulator for local fuel return within the TMS, may be an auxiliary TMS tank downstream of a "main" fuel tank (e.g., an aircraft fuel tank), or may be the "main" fuel tank itself. Thus, the fuel tank of the TMS may be a TMS vessel or may be the fuel source of an engine and/or vehicle in which the TMS is used. Moreover, the TMS described herein, utilizing fuel as a heat storage mechanism, provides a regenerative TMS solution that takes advantage of an available heat sink. As such, an additional thermal energy storage system, such as wax or liquid metal, can be avoided or eliminated, which also eliminates drawbacks associated with such systems, e.g., wax would require too much volume to be a viable thermal energy storage system and liquid metals are heavy and corrosive.

Additionally, another benefit or advantage of the TMS described herein is that the fuel flowpath or fuel loop may be designed with a rapid transient response capability. For example, to help cool mission systems of an aircraft, the fuel flowpath transient may be designed to exceed the time constant for an air cycle machine (ACM), such as an air-based refrigerator. Further, it will be appreciated that the TMS described herein may effectively leverage existing systems to get chilled fuel in operation. Colder fuel may improve dynamic temperature response during quick deceleration or chops, which risk exceeding the effective, stable, or operational temperature limits of the fuel because metal components of the fuel system are still hot, and may offset fuel pump heat generation. Moreover, colder fuel may provide soak-back thermal management functionality to reduce and/or prevent fuel nozzle coking or the like, e.g., by burning cooled fuel through landing, taxi, and shutdown of an aircraft, when airflow cooling streams are reduced and/or stopped but the metal components of the fuel system remain hot. Thus, the present subject matter provides benefits and advantages with respect to various thermal transient issues that may be encountered in an engine and/or a vehicle, such as an aircraft, in which the TMS may be used.

Other benefits and advantages of the systems described herein also may occur to those having ordinary skill in the art.

Further aspects of the invention are provided by the subject matter of the following clauses:

1. A system comprising a coolant flowpath having a coolant flowing therethrough; a cooling system for cooling the coolant disposed along the coolant flowpath; a fuel flowpath having a fuel flowing therethrough; a coolant-fuel heat exchanger for heat transfer between the coolant and the fuel to cool the fuel, the coolant-fuel heat exchanger fluidly connected to both the coolant flowpath and the fuel flowpath; and a fuel tank for accumulating the cooled fuel, wherein the fuel is in thermal communication with a first thermal load to cool the first thermal load.

2. The system of any preceding clause, wherein the coolant is in thermal communication with a second thermal load to cool the second thermal load.

3. The system of any preceding clause, further comprising a second fuel tank, the fuel flowing to the fuel flowpath from the second fuel tank.

4. The system of any preceding clause, further comprising a thermal transport flowpath having a thermal transport fluid flowing therethrough and a coolant-transport heat exchanger for heat transfer between the coolant and the thermal transport fluid, the coolant-transport heat exchanger fluidly connected to both the coolant flowpath and the thermal transport flowpath, wherein the thermal transport fluid is in thermal communication with a third thermal load to cool the third thermal load.

5. The system of any preceding clause, wherein the coolant-fuel heat exchanger and the coolant-transport heat exchanger are arranged in series with respect to the coolant flowpath.

6. The system of any preceding clause, further comprising a first three-way switching valve disposed proximate the coolant-transport heat exchanger and a second three-way switching valve disposed proximate the coolant-fuel heat exchanger, wherein a position of each of the first three-way switching valve and the second three-way switching valve may be changed to reverse a flow direction of the coolant with respect to the coolant-transport heat exchanger and the coolant-fuel heat exchanger.

7. The system of any preceding clause, wherein the cooling system is a refrigeration system and the coolant is a refrigerant.

8. The system of any preceding clause, wherein the cooling system is configured to reduce a temperature of the coolant below a temperature of the fuel.

9. The system of any preceding clause, further comprising a fuel valve disposed in the fuel flowpath, wherein the fuel valve is configured to control the flow of fuel between the fuel tank and the first thermal load.

10. The system of any preceding clause, further comprising a thermal transport flowpath having a thermal transport fluid flowing therethrough and a coolant-transport heat exchanger for cooling the thermal transport fluid, wherein the thermal transport fluid is in thermal communication with a third thermal load to cool the third thermal load, and wherein the coolant-fuel heat exchanger and the coolant-transport exchanger are arranged in parallel.

11. The system of any preceding clause, further comprising a thermal transport flowpath having a thermal transport fluid flowing therethrough and a coolant-transport heat exchanger for cooling the thermal transport fluid, wherein the thermal transport fluid is used to cool a third thermal load, and wherein the coolant-fuel heat exchanger and the coolant-transport heat exchanger are arranged in series.

12. The system of any preceding clause, wherein the coolant flowpath is a closed loop flowpath.

13. The system of any preceding clause, wherein the coolant-fuel heat exchanger includes the fuel tank for accumulating the cooled fuel.

14. The system of any preceding clause, wherein the cooling system is an air-based cooling system and the coolant is air.

15. The system of any preceding clause, wherein the system is disposed in a vehicle, the vehicle comprising a turbine engine including a compressor section, a combustion section, and a turbine section arranged in serial flow order, the turbine engine defining a turbine engine inlet upstream of the compressor section and a turbine engine exhaust downstream of the turbine section; and a fuel delivery system for providing a flow of the fuel to the combustion section of the turbine engine, the fuel delivery system comprising a main fuel tank, wherein the system is in flow communication with the main fuel tank and engine bleed air from the turbine engine.

16. A system comprising a coolant flowpath having a coolant flowing therethrough; a fuel flowpath having a fuel flowing therethrough; a thermal transport flowpath having a thermal transport fluid flowing therethrough; a fuel-transport heat exchanger for heat transfer between the fuel and the thermal transport fluid to cool the fuel, the fuel-transport heat exchanger fluidly connected to both the fuel flowpath and the thermal transport flowpath; and a fuel tank for accumulating the cooled fuel, wherein the fuel is in thermal communication with a first thermal load to cool the first thermal load and the thermal transport fluid is in thermal communication with a second thermal load to cool the second thermal load.

17. The system of any preceding clause, wherein the first load is in thermal communication with the second thermal load for heat transfer between the fuel flowpath and the thermal transport flowpath.

18. The system of any preceding clause, wherein the fuel-transport heat exchanger includes the fuel tank.

19. The system of any preceding clause, further comprising a coolant-transport heat exchanger for heat transfer between the coolant and the thermal transport fluid, the coolant-transport heat exchanger fluidly connected to both the coolant flowpath and the thermal transport flowpath.

20. A method of operating a system, the method comprising flowing a coolant along a coolant flowpath, the coolant flowpath including a cooling system such that the coolant passes through the cooling system to cool the coolant, the coolant flowpath further including a coolant-cooled thermal load $L_{cool}$; flowing a fuel along a fuel flowpath, the fuel flowpath including a fuel tank for accumulating the fuel and a fuel-cooled thermal load $L_{fuel}$; passing both the coolant and the fuel through a coolant-fuel heat exchanger to cool the fuel; and controlling the flow of the fuel from the coolant-fuel heat exchanger to the fuel tank for accumulation of the cooled fuel, wherein the coolant has a thermal capacity $TC_{cool}$ and the fuel has a thermal capacity $TC_{fuel}$.

21. The method of any preceding clause, wherein controlling the flow of the fuel from the coolant-fuel heat exchanger comprises controlling the flow of the fuel from the coolant-fuel heat exchanger to the fuel tank and controlling the flow of the fuel from the coolant-fuel heat exchanger to a fuel use location, wherein the flow of the fuel includes a flow $F_{tank}$ of the fuel to the fuel tank and a flow $F_{use}$ of the fuel to the fuel use location, and wherein the flow of the fuel is controlled such that $F_{tank}/F_{use} > 1$ when $TC_{cool} > L_{cool}$.

22. The method of any preceding clause, wherein controlling the flow of the fuel from the coolant-fuel heat exchanger comprises controlling the flow of the fuel from the coolant-fuel heat exchanger to the fuel tank and controlling the flow of the fuel from the coolant-fuel heat exchanger to a fuel use location, wherein the flow of the fuel includes a flow $F_{tank}$ of the fuel to the fuel tank and a flow $F_{use}$ of the fuel to the fuel use location, and wherein the flow of the fuel is controlled such that $F_{tank}/F_{use} > -0.50$ when $L_{fuel} > TC_{fuel}$.

23. The method of any preceding clause, wherein controlling the flow of the fuel from the coolant-fuel heat exchanger comprises modulating a fuel recirculation valve.

24. The method of any preceding clause, further comprising controlling the flow of the fuel from the coolant-fuel heat exchanger to a fuel-cooled thermal load.

25. The method of any preceding clause, further comprising bypassing the coolant-fuel heat exchanger with the flow of the fuel.

26. The method of any preceding clause, wherein bypassing the coolant-fuel heat exchanger comprises modulating a fuel cooler bypass valve disposed in the fuel flowpath upstream of the coolant-fuel heat exchanger.

27. The method of any preceding clause, further comprising controlling the flow of the coolant from the coolant-fuel heat exchanger to a coolant-cooled thermal load.

28. The method of any preceding clause, further comprising controlling the flow of the coolant from the coolant system to the coolant-fuel heat exchanger and the coolant-cooled thermal load.

29. The method of any preceding clause, wherein controlling the flow of the coolant from the cooling system comprises modulating a refrigerant switching valve.

30. The method of any preceding clause, further comprising flowing a thermal transport fluid along a thermal transport flowpath; and passing both the coolant and the thermal transport fluid through a coolant-transport heat exchanger to cool the thermal transport fluid.

31. The method of any preceding clause, further comprising controlling the flow of the thermal transport fluid from the coolant-transport heat exchanger to a transport-cooled thermal load.

32. The method of any preceding clause, wherein controlling the flow of the thermal transport fluid comprises modulating a valve.

33. The method of any preceding clause, wherein the coolant flows from the cooling system through the coolant-transport heat exchanger before flowing through the coolant-fuel heat exchanger.

34. The method of any preceding clause, wherein the coolant flows from the cooling system through the coolant-fuel heat exchanger before flowing through the coolant-transport heat exchanger.

35. The method of any preceding clause, wherein the coolant-fuel heat exchanger and the coolant-transport heat exchanger are arranged in series, and further comprising controlling a flow direction of the coolant through the coolant-fuel heat exchanger and the coolant-transport heat exchanger with a pair of three-way valves.

36. The method of any preceding clause, further comprising driving the flow of the coolant along the coolant flowpath using a pump.

37. The method of any preceding clause, wherein the system is disposed in a vehicle comprising a turbine engine, and wherein the cooling system is an air cycle machine.

38. The method of any preceding clause, further comprising cooling engine bleed air in a fan duct heat exchanger through heat exchange with a fan stream; flowing the cooled engine bleed air through a turbine of the air cycle machine; flowing the cooled engine bleed air through a cooling load heat exchanger to cool the coolant, thereby warming the engine bleed air; flowing the warmed engine bleed air through a compressor driven by the turbine of the air cycle machine; and flowing the compressed engine bleed air to the fan stream.

39. The method of any preceding clause, wherein the coolant-fuel heat exchanger and the fuel tank are a single component tank-exchanger that both exchanges heat and accumulates the fuel.

40. The method of any preceding clause, controlling the flow of the coolant between the single component tank-exchanger and the coolant-transport heat exchanger using a refrigerant switching valve disposed in the coolant flowpath.

41. The method of any preceding clause, wherein the single component tank-exchanger and the coolant-transport heat exchanger are arranged in series.

42. The method of any preceding clause, further comprising bypassing the single component tank-exchanger with the flow of the coolant.

43. The method of any preceding clause, wherein bypassing the single component tank-exchanger comprises modulating a regenerator modulation valve disposed in the coolant flowpath upstream of the single component tank-exchanger.

44. The method of any preceding clause, further comprising controlling the flow of coolant between the single component tank-exchanger and the coolant-transport heat exchanger using a regenerator modulation valve and a coolant bypass line extending around the single component tank-exchanger.

45. The method of any preceding clause, wherein the fuel tank is a single component tank-exchanger comprising a coolant-fuel heat exchanger formed with the fuel tank for heat exchange between the coolant and the fuel, and further comprising, if a cooling capacity of the cooling system is low relative to cooling demand, bypassing the single component tank-exchanger with the flow of coolant and, if not, bypassing the coolant-fuel heat exchanger with both the flow of coolant and the flow of fuel.

46. The method of any preceding clause, wherein bypassing the single component tank-exchanger with the flow of coolant comprises modulating a refrigerant switching valve, and wherein bypassing the coolant-fuel heat exchanger with both the flow of coolant and the flow of fuel comprises modulating the refrigerant switching valve and a fuel modulation valve.

47. A method of operating a system, the method comprising flowing a heat exchange fluid along a heat exchange fluid flowpath; flowing a fuel along a fuel flowpath, the fuel flowpath including a fuel tank for accumulating the fuel; passing both the heat exchange fluid and the fuel through a heat exchanger to cool the fuel; and controlling the flow of the fuel from the heat exchanger to the fuel tank for accumulation of the cooled fuel.

48. The method of any preceding clause, wherein controlling the flow of the fuel from the heat exchanger comprises modulating a fuel recirculation valve.

49. The method of any preceding clause, wherein the heat exchange fluid is a coolant and the heat exchange fluid flowpath is a coolant flowpath.

50. The method of any preceding clause, wherein the coolant flowpath includes a cooling system such that the coolant passes through the cooling system to cool the coolant.

51. The method of any preceding clause, further comprising controlling the flow of the coolant from the heat exchanger to a coolant-cooled thermal load.

52. The method of any preceding clause, wherein the heat exchange fluid is a thermal transport fluid and the heat exchange fluid flowpath is a thermal transport flowpath.

53. The method of any preceding clause, further comprising controlling the flow of the thermal transport fluid between the heat exchanger and a transport-cooled thermal load.

54. The method of any preceding clause, wherein controlling the flow of the thermal transport fluid comprises modulating a valve positioned in the thermal transport flowpath upstream of the heat exchanger.

55. The method of any preceding clause, further comprising flowing a thermal transport fluid along a thermal transport flowpath; and passing both the coolant and the thermal transport fluid through a coolant-transport heat exchanger to cool the thermal transport fluid.

56. The method of any preceding clause, further comprising controlling the flow of the thermal transport fluid from the coolant-transport heat exchanger to a transport-cooled thermal load.

57. The method of any preceding clause, wherein the heat exchange fluid is the thermal transport fluid and the heat exchanger is a fuel-transport heat exchanger.

58. The method of any preceding clause, wherein the fuel-transport heat exchanger and the fuel tank are a single component that both exchanges heat and accumulates the fuel.

59. The method of any preceding clause, further comprising passing both the coolant and the thermal transport fluid through a second coolant-transport heat exchanger disposed in the thermal transport flowpath downstream from the transport-cooled load.

60. The method of any preceding clause, wherein the coolant-transport heat exchanger, the fuel-transport heat exchanger, and the transport-cooled thermal load are arranged in series.

61. The method of any preceding clause, wherein the heat exchange fluid is the thermal transport fluid and the heat exchanger is a fuel-transport heat exchanger, wherein the fuel tank is a single component tank-exchanger comprising a coolant-fuel heat exchanger formed with the fuel tank for heat exchange between the coolant and the fuel, and further comprising, if a cooling capacity of the cooling system is low relative to cooling demand, bypassing the single component tank-exchanger with the flow of coolant and passing both the thermal transport fluid and the fuel through the fuel-transport heat exchanger and, if not, bypassing the fuel-transport heat exchanger with the flow of fuel and the flow of the thermal transport fluid and passing both the coolant and the fuel through the single component tank-exchanger.

62. The method of any preceding clause, wherein bypassing the single component tank-exchanger with the coolant comprises modulating a regenerator modulation valve, wherein bypassing the fuel-transport heat exchanger with the fuel comprises modulating a fuel modulation valve, and wherein bypassing the fuel-transport heat exchanger with the thermal transport fluid comprises modulating a transport modulation valve.

63. The method of any preceding clause, further comprising driving the flow of the thermal transport fluid along the thermal transport flowpath using a pump.

64. The method of any preceding clause, further comprising driving the flow of the fuel along the fuel flowpath using a pump.

65. The method of any preceding clause, further comprising controlling the flow of the fuel from the heat exchanger to a fuel-cooled thermal load.

66. A system comprising a coolant flowpath containing a coolant having a thermal capacity $TC_{cool}$, the coolant flowpath including a cooling system configured to cool the coolant and a coolant-cooled thermal load $L_{cool}$; a fuel flowpath containing a fuel having a thermal capacity $TC_{fuel}$, the fuel flowpath including a fuel tank for accumulating the fuel and a fuel-cooled thermal load $L_{fuel}$; a coolant-fuel heat exchanger in thermal communication with the fuel and coolant such that heat flows from the fuel to the coolant to cool the fuel; and an active or passive system configured to control a flow $F_{tank}$ of the fuel from the coolant-fuel heat exchanger to the fuel tank for accumulation of the cooled fuel and a flow $F_{use}$ of the fuel to a fuel use location such that $F_{tank}/F_{use}>1$ when $TC_{cool}>L_{cool}$ and $F_{tank}/F_{use}>-0.50$ when $L_{fuel}>TC_{fuel}$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A system, comprising:
   a coolant flowpath containing a coolant having a thermal capacity $TC_{cool}$, the coolant flowpath including a cooling system configured to cool the coolant and a coolant-cooled thermal load $L_{cool}$;
   a fuel flowpath containing a fuel having a thermal capacity $TC_{fuel}$, the fuel flowpath including a fuel tank for accumulating the fuel and a fuel-cooled thermal load $L_{fuel}$;
   a coolant-fuel heat exchanger in thermal communication with the fuel and coolant such that heat flows from the fuel to the coolant to cool the fuel; and
   a controller configured to control a flow $F_{tank}$ of the fuel from the coolant-fuel heat exchanger to the fuel tank for accumulation of the cooled fuel and a flow $F_{use}$ of the fuel to a fuel use location such that $F_{tank}/F_{use}>1$ when $TC_{cool}>L_{cool}$ and $F_{tank}/F_{use}<-0.50$ when $L_{fuel}>TC_{fuel}$.

2. The system of claim 1, wherein the coolant is in thermal communication with the coolant-cooled thermal load $L_{cool}$ to cool the coolant-cooled thermal load $L_{cool}$.

3. The system of claim 1, further comprising:
   a second fuel tank, the fuel flowing to the fuel flowpath from the second fuel tank.

4. The system of claim 1, further comprising:
   a thermal transport flowpath having a thermal transport fluid flowing therethrough; and
   a coolant-transport heat exchanger for heat transfer between the coolant and the thermal transport fluid, the coolant-transport heat exchanger fluidly connected to both the coolant flowpath and the thermal transport flowpath,
   wherein the thermal transport fluid is in thermal communication with a transport-cooled thermal load to cool the transport-cooled thermal load.

5. The system of claim 4, wherein the coolant-fuel heat exchanger and the coolant-transport heat exchanger are arranged in series with respect to the coolant flowpath.

6. The system of claim 5, further comprising:
   a first three-way switching valve disposed proximate the coolant-transport heat exchanger; and
   a second three-way switching valve disposed proximate the coolant-fuel heat exchanger,
   wherein a position of each of the first three-way switching valve and the second three-way switching valve may be changed to reverse a flow direction of the coolant with respect to the coolant-transport heat exchanger and the coolant-fuel heat exchanger.

7. The system of claim 1, wherein the cooling system is a refrigeration system and the coolant is a refrigerant.

8. The system of claim 1, wherein the cooling system is configured to reduce a temperature of the coolant below a temperature of the fuel.

9. The system of claim 1, further comprising:
   a fuel valve disposed in the fuel flowpath,
   wherein the fuel valve is configured to control the flow of fuel between the fuel tank and the fuel-cooled thermal load $L_{fuel}$.

10. The system of claim 1, further comprising:
    a thermal transport flowpath having a thermal transport fluid flowing therethrough; and
    a coolant-transport heat exchanger for cooling the thermal transport fluid,
    wherein the thermal transport fluid is used to cool a transport-cooled thermal load, and
    wherein the coolant-fuel heat exchanger and the coolant-transport heat exchanger are arranged in parallel.

11. The system of claim 1, further comprising:
a thermal transport flowpath having a thermal transport fluid flowing therethrough; and
a coolant-transport heat exchanger for cooling the thermal transport fluid,
wherein the thermal transport fluid is in thermal communication with a transport-cooled thermal load to cool the transport-cooled thermal load, and
wherein the coolant-fuel heat exchanger and the coolant-transport heat exchanger are arranged in series.

12. The system of claim 1, wherein the coolant flowpath is a closed loop flowpath.

13. The system of claim 1, wherein the coolant-fuel heat exchanger includes the fuel tank for accumulating the fuel.

14. The system of claim 13, wherein the cooling system is an air-based cooling system and the coolant is air.

15. The system of claim 1, wherein the system is disposed in a vehicle, the vehicle comprising:
a turbine engine including a compressor section, a combustion section, and a turbine section arranged in serial flow order, the turbine engine defining a turbine engine inlet upstream of the compressor section and a turbine engine exhaust downstream of the turbine section; and
a fuel delivery system for providing a flow of the fuel to the combustion section of the turbine engine, the fuel delivery system comprising a main fuel tank,
wherein the system is in flow communication with the main fuel tank and engine bleed air from the turbine engine.

16. The system of claim 1, further comprising:
a thermal transport flowpath having a thermal transport fluid flowing therethrough;
a fuel-transport heat exchanger for heat transfer between the fuel and the thermal transport fluid to cool the fuel, the fuel-transport heat exchanger fluidly connected to both the fuel flowpath and the thermal transport flowpath,
wherein the thermal transport fluid is in thermal communication with a transport-cooled thermal load to cool the transport-cooled thermal load.

17. The system of claim 16, wherein the fuel-cooled thermal load $L_{fuel}$ is in thermal communication with the transport-cooled thermal load for heat transfer between the fuel flowpath and the thermal transport flowpath.

18. The system of claim 16, wherein the fuel-transport heat exchanger includes the fuel tank.

19. A method of operating a system, the method comprising:
flowing a coolant along a coolant flowpath, the coolant flowpath including a cooling system such that the coolant passes through the cooling system to cool the coolant, the coolant flowpath further including a coolant-cooled thermal load $L_{cool}$;
flowing a fuel along a fuel flowpath, the fuel flowpath including a fuel tank for accumulating the fuel and a fuel-cooled thermal load $L_{fuel}$;
passing both the coolant and the fuel through a coolant-fuel heat exchanger to cool the fuel;
controlling the flow of the fuel from the coolant-fuel heat exchanger to the fuel tank for accumulation of the cooled fuel; and
controlling the flow of the fuel from the coolant-fuel heat exchanger to a fuel use location,
wherein the coolant has a thermal capacity $TC_{cool}$ and the fuel has a thermal capacity $TC_{fuel}$,
wherein the flow of the fuel includes a flow $F_{tank}$ of the fuel to the fuel tank and a flow $F_{use}$ of the fuel to the fuel use location, and
wherein the flow of the fuel is controlled such that $F_{tank}/F_{use} > 1$ when $TC_{cool} > L_{cool}$.

20. A method of operating a system, the method comprising:
flowing a coolant along a coolant flowpath, the coolant flowpath including a cooling system such that the coolant passes through the cooling system to cool the coolant, the coolant flowpath further including a coolant-cooled thermal load $L_{cool}$;
flowing a fuel along a fuel flowpath, the fuel flowpath including a fuel tank for accumulating the fuel and a fuel-cooled thermal load $L_{fuel}$;
passing both the coolant and the fuel through a coolant-fuel heat exchanger to cool the fuel;
controlling the flow of the fuel from the coolant-fuel heat exchanger to the fuel tank for accumulation of the cooled fuel; and
controlling the flow of the fuel from the coolant-fuel heat exchanger to a fuel use location,
wherein the coolant has a thermal capacity $TC_{cool}$ and the fuel has a thermal capacity $TC_{fuel}$,
wherein the flow of the fuel includes a flow $F_{tank}$ of the fuel to the fuel tank and a flow $F_{use}$ of the fuel to the fuel use location, and
wherein the flow of the fuel is controlled such that $F_{tank}/F_{use} < -0.50$ when $L_{fuel} > TC_{fuel}$.

21. A system, comprising:
a coolant flowpath containing a coolant having a thermal capacity $TC_{cool}$, the coolant flowpath including a cooling system configured to cool the coolant and a coolant-cooled thermal load $L_{cool}$;
a fuel flowpath containing a fuel having a thermal capacity $TC_{fuel}$, the fuel flowpath including a fuel tank for accumulating the fuel and a fuel-cooled thermal load $L_{fuel}$;
a coolant-fuel heat exchanger in thermal communication with the fuel and coolant such that heat flows from the fuel to the coolant to cool the fuel; and
one or more valves automatically actuated by a change in temperature, a change in pressure, or a change in both temperature and pressure to control a flow $F_{tank}$ of the fuel from the coolant-fuel heat exchanger to the fuel tank for accumulation of the cooled fuel and a flow $F_{use}$ of the fuel to a fuel use location such that $F_{tank}/F_{use} > 1$ when $TC_{cool} > L_{cool}$ and $F_{tank}/F_{use} < -0.50$ when $L_{fuel} > TC_{fuel}$.

* * * * *